(12) United States Patent
Castinado et al.

(10) Patent No.: US 10,475,030 B2
(45) Date of Patent: Nov. 12, 2019

(54) SYSTEM FOR IMPLEMENTING A DISTRIBUTED LEDGER ACROSS MULTIPLE NETWORK NODES

(71) Applicant: Bank of America Corporation, Charlotte, NC (US)

(72) Inventors: Joseph Benjamin Castinado, North Glenn, CO (US); James Gregory Ronca, Decatur, GA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 335 days.

(21) Appl. No.: 15/050,294

(22) Filed: Feb. 22, 2016

(65) Prior Publication Data
US 2017/0243212 A1     Aug. 24, 2017

(51) Int. Cl.
*G06Q 40/00* (2012.01)
*G06Q 20/40* (2012.01)
*G06Q 20/38* (2012.01)

(52) U.S. Cl.
CPC ......... *G06Q 20/401* (2013.01); *G06Q 20/389* (2013.01)

(58) Field of Classification Search
CPC ............................... G06Q 20/40; G06Q 20/10
(Continued)

(56) References Cited

U.S. PATENT DOCUMENTS 5,671,283 A   9/1997 Michener et al.
5,835,599 A   11/1998 Buer
(Continued)

FOREIGN PATENT DOCUMENTS

WO   WO 2014162296   10/2014
WO   WO 2015135018   9/2015

OTHER PUBLICATIONS

Tasca. "Digital Currencies: Principles, Trends, Opportunities, and Risks." Trends, Opportunities, and Risks. Sep. 7, 2015 (Sep. 7, 2015); Retrieved from https://www.researchgate.net/profile/Paolo_Tasca/publication/290805276_Digital_Currencies_Principles_Trends_Opportunities_and_Risk/Links569bb91e)8ae6169e562552.pif, p. 1, 5, 10, 12, 14.

(Continued)

*Primary Examiner* — Ojo O Oyebisi
(74) *Attorney, Agent, or Firm* — Michael A. Springs; Moore & Van Allen PLLC; James C. Edwards

(57) ABSTRACT

Embodiments enable a system operatively connected with a block chain distributed network to use the block chain distributed network for validation (i.e., authorization) of a payment transaction. The system receives a transaction record associated with a payment transaction, wherein the transaction record comprises transaction data indicating a payor, a payee and an amount; accesses a distributed ledger stored in the memory device, wherein the distributed ledger is updated based on communications from a block chain distributed network; and, using payment transaction logic, determines whether the transaction record represents a valid transaction by, e.g., communicate the transaction record to a validating node for validation of the transaction record. Once validated, the system (or validating node) communicates validation of the transaction record to the block chain distributed network, e.g., by updating the distributed ledger with information indicating validation of the transaction record and providing access to the distributed ledger to the network.

18 Claims, 14 Drawing Sheets

(58) Field of Classification Search
USPC .......................................................... 705/44
See application file for complete search history.

(56) References Cited

U.S. PATENT DOCUMENTS

| | | | |
|---|---|---|---|
| 6,073,234 | A | 6/2000 | Kigo et al. |
| 6,324,286 | B1 | 11/2001 | Lai et al. |
| 6,330,655 | B1 | 12/2001 | Vishlitzky et al. |
| 6,725,303 | B1 | 4/2004 | Hoguta et al. |
| 6,850,252 | B1 | 2/2005 | Hoffberg |
| 6,973,187 | B2 | 12/2005 | Gligor et al. |
| 7,055,039 | B2 | 5/2006 | Chavanne et al. |
| 7,092,400 | B2 | 8/2006 | Malzahn |
| 7,184,549 | B2 | 2/2007 | Sorimachi et al. |
| 7,362,859 | B1 | 4/2008 | Robertson et al. |
| 7,392,384 | B2 | 6/2008 | Hopkins et al. |
| 7,428,306 | B2 | 9/2008 | Celikkan et al. |
| 7,502,933 | B2 | 3/2009 | Jakobsson et al. |
| 7,574,401 | B1 | 8/2009 | Burns |
| 7,649,992 | B2 | 1/2010 | Raju et al. |
| 7,764,788 | B2 | 7/2010 | Tardo |
| 7,979,889 | B2 | 7/2011 | Gladstone et al. |
| 8,078,874 | B2 | 12/2011 | You et al. |
| 8,107,621 | B2 | 1/2012 | Celikkan et al. |
| 8,155,311 | B2 | 4/2012 | Shin et al. |
| 8,259,934 | B2 | 9/2012 | Karroumi et al. |
| 8,358,781 | B2 | 1/2013 | Schneider |
| 8,397,841 | B1 | 2/2013 | Taylor et al. |
| 8,396,209 | B2 | 3/2013 | Schneider |
| 8,416,947 | B2 | 4/2013 | Schneider |
| 8,458,461 | B2 | 6/2013 | Tardo |
| 8,464,320 | B2 | 6/2013 | Archer et al. |
| 8,516,266 | B2 | 8/2013 | Hoffberg et al. |
| 8,590,055 | B2 | 11/2013 | Yoon et al. |
| 8,737,606 | B2 | 5/2014 | Taylor et al. |
| 8,942,374 | B2 | 1/2015 | Fujisaki |
| 8,983,063 | B1 | 3/2015 | Taylor et al. |
| 9,059,866 | B2 | 6/2015 | Bar-Sade et al. |
| 9,083,702 | B2 | 7/2015 | Wied et al. |
| 9,092,766 | B1 | 7/2015 | Bedier et al. |
| 9,298,806 | B1 | 3/2016 | Vessenes et al. |
| 9,635,000 | B1 | 4/2017 | Muftic |
| 9,672,499 | B2 | 6/2017 | Yang et al. |
| 2001/0020249 | A1 | 9/2001 | Shim |
| 2003/0126094 | A1 | 7/2003 | Fisher et al. |
| 2004/0172535 | A1 | 9/2004 | Jakobsson et al. |
| 2004/0199463 | A1 | 10/2004 | Deggendorf |
| 2005/0256802 | A1 | 11/2005 | Ammermann et al. |
| 2009/0094075 | A1 | 4/2009 | Parisien et al. |
| 2009/0125986 | A1 | 5/2009 | Kiester et al. |
| 2009/0281948 | A1 | 11/2009 | Carlson |
| 2010/0107225 | A1 | 4/2010 | Spencer et al. |
| 2010/0279653 | A1 | 11/2010 | Poltorak |
| 2011/0055913 | A1 | 3/2011 | Wong |
| 2011/0078073 | A1 | 3/2011 | Annappindi |
| 2011/0197064 | A1 | 8/2011 | Garcia Morchon et al. |
| 2012/0066121 | A1 | 3/2012 | Shahbazi et al. |
| 2012/0284175 | A1 | 11/2012 | Wilson et al. |
| 2013/0198061 | A1 | 8/2013 | Cheer et al. |
| 2013/0204783 | A1 | 8/2013 | Klose et al. |
| 2013/0232056 | A1 | 9/2013 | Schulman |
| 2013/0346294 | A1 | 12/2013 | Faith et al. |
| 2014/0006185 | A1 | 1/2014 | Zurn et al. |
| 2014/0089243 | A1 | 3/2014 | Oppenheimer |
| 2014/0114857 | A1 | 4/2014 | Griggs et al. |
| 2014/0295956 | A1 | 10/2014 | Katz et al. |
| 2014/0310171 | A1 | 10/2014 | Grossman et al. |
| 2015/0127527 | A1* | 5/2015 | Eide .................... G06Q 20/227 705/39 |
| 2015/0172053 | A1 | 6/2015 | Schwarz et al. |
| 2015/0206106 | A1 | 7/2015 | Yago |
| 2015/0262137 | A1 | 9/2015 | Armstrong |
| 2015/0332283 | A1 | 11/2015 | Witchey |
| 2015/0379510 | A1 | 12/2015 | Smith |
| 2015/0379636 | A1 | 12/2015 | Szabo et al. |
| 2016/0012424 | A1 | 1/2016 | Simon et al. |
| 2016/0028552 | A1 | 1/2016 | Spanos et al. |
| 2016/0050203 | A1 | 2/2016 | Hefetz |
| 2016/0092874 | A1 | 3/2016 | O'Regan et al. |
| 2016/0125376 | A1 | 5/2016 | Beatty et al. |
| 2016/0191243 | A1 | 6/2016 | Manning |
| 2016/0275461 | A1* | 9/2016 | Sprague ............. G06Q 20/0655 |
| 2016/0292672 | A1 | 10/2016 | Fay et al. |
| 2016/0321654 | A1 | 11/2016 | Lesavich et al. |
| 2016/0323109 | A1 | 11/2016 | McCoy et al. |
| 2016/0342978 | A1 | 11/2016 | Davis et al. |
| 2016/0342989 | A1 | 11/2016 | Davis |
| 2016/0342994 | A1 | 11/2016 | Davis |
| 2017/0005804 | A1 | 1/2017 | Zinder |
| 2017/0011460 | A1* | 1/2017 | Molinari ................ G06Q 40/04 |
| 2017/0046526 | A1 | 2/2017 | Chan et al. |
| 2017/0046664 | A1 | 2/2017 | Haldenby et al. |
| 2017/0046680 | A1 | 2/2017 | Crites |
| 2017/0046806 | A1 | 2/2017 | Haldenby et al. |
| 2017/0091397 | A1 | 3/2017 | Shah |
| 2017/0103167 | A1 | 4/2017 | Shah |
| 2017/0103461 | A1 | 4/2017 | Acuña-Rohter et al. |
| 2017/0109735 | A1 | 4/2017 | Sheng et al. |
| 2017/0116693 | A1 | 4/2017 | Rae et al. |
| 2017/0132625 | A1† | 5/2017 | Kennedy |
| 2017/0132626 | A1 | 5/2017 | Kennedy |
| 2017/0132630 | A1 | 5/2017 | Castinado et al. |
| 2017/0140375 | A1 | 5/2017 | Kunstel |
| 2017/0163733 | A1 | 6/2017 | Grefen et al. |
| 2017/0177855 | A1 | 6/2017 | Costa Faidella et al. |
| 2017/0178131 | A1 | 6/2017 | Fernandez et al. |
| 2017/0178237 | A1 | 6/2017 | Wong |
| 2017/0180134 | A1 | 6/2017 | King |
| 2017/0200137 | A1 | 7/2017 | Vilmont |
| 2017/0213209 | A1 | 7/2017 | Dillenberger |
| 2017/0214675 | A1 | 7/2017 | Johnsrud et al. |
| 2017/0214698 | A1 | 7/2017 | Hughes et al. |
| 2017/0220998 | A1 | 8/2017 | Horn et al. |
| 2017/0221052 | A1 | 8/2017 | Sheng et al. |
| 2017/0223005 | A1 | 8/2017 | Birgisson et al. |
| 2017/0228447 | A1 | 8/2017 | Catania et al. |
| 2017/0228822 | A1 | 8/2017 | Creighton, IV et al. |
| 2017/0230375 | A1 | 8/2017 | Kurian |
| 2017/0230378 | A1 | 8/2017 | Bliss |
| 2017/0232300 | A1† | 8/2017 | Tran et al. |
| 2017/0235955 | A1 | 8/2017 | Barkan |
| 2017/0236407 | A1 | 8/2017 | Rhoads et al. |
| 2017/0243020 | A1 | 8/2017 | Dhondse et al. |
| 2017/0243287 | A1 | 8/2017 | Johnsrud et al. |
| 2018/0053161 | A1 | 2/2018 | Bordash et al. |
| 2018/0268479 | A1 | 9/2018 | Dowling et al. |

OTHER PUBLICATIONS

Lerner. "MAVEPAY, a New Lightweight Payment Scheme for Peer to Peer Currency Networks." Apr. 17, 2012 ((Apr. 17, 2012) Retrieved from <https://pdfs.semanticscholar.org/1185/a26f014678b959876519065e2624458d75b8.pdf>. Entire document.

PCT International Searching Authority; International Search Report and Written Opinion for PCT/US2016/061402 dated Dec. 27, 2016.

Buterin, Vitalik, "On Public and Private Blockchains", Aug. 7, 2015, https://blog.ethereum.org/2015/08/07/on-public-and-private-blockchains/.

Malahov, Yanislav Georgiev, "BitAlias 1, Aka Usernames for Bitcoin, a New, Simple Naming System for Bitcoin Addresses", retrieved from https://medium.com/bitalias-decentralized-naming-and-identity-service/bitalias-7b66bffed9d8 on Mar. 12, 2017; Bringing Crypto to the People, Founder of www.aeternity.com, Jun. 6, 2015, 6 pages.

PCT International Searching Authority; Written Opinion for PCT/IB16/01655 completed Mar. 11, 2017, 8 pages.

PCT International Searching Authority; International Search Report for PCT/IB16/01655 completed Mar. 12, 2017, 4 pages.

Bradley Hope et al., "A Bitcoin Technology Gets Nasdaq Test"; May 10, 2015; retrieved from http://www.wsj.com/articles/a-bitcoin-technology-gets-nasdaq-test-1431296886.

(56) References Cited

OTHER PUBLICATIONS

Nathaniel Popper, "Bitcoin Technology Piques Interest on Wall Street"; Aug. 28, 2015 retrieved from http://www.nytimes.com/2015/08/31/business/dealbook/bitcoin-techno, Aug. 31, 2015.
Joseph C. Guagliardo et al., "Blockchain: Preparing for Disruption Like It's the '90s"; Mar. 14, 2016, retrieved from http://www.law360.com/articles/77120CVprint?section=ip.
Robert Mcmillian, "IBM Bets on Bitcoin Ledger"; Feb. 16, 2016, retrieved from http://www.wsj.com/articles/ibm-bets-on-bitcoin-ledger-1455598864.
Richard Lee Twesige, "A simple explanation of Bitcoin and Blockchain technology"; Jan. 2015, retrieved from http://www.researchgate.net/profile/Richard_Twesige/publication/270287317_Bitcoin_A_simple_explanation_of_Bitcoin_and_Block_Chain_technology_JANUARY_2015_RICHARD_LEE_TWESIGE/links/54a7836f0cf267bdb90a0ee6.pdf.

\* cited by examiner
† cited by third party

US 10,475,030 B2

SYSTEM FOR IMPLEMENTING A DISTRIBUTED LEDGER ACROSS MULTIPLE NETWORK NODES

BACKGROUND

Historically, payment authorization and settlement is performed across traditional payment rails. Such communication channels typically require routing of communications from an acquiring bank to an issuing bank for authorization. Such communications must travel across rails such as those operated by third party credit card providers. Accordingly, a need exists for a distributed network for facilitating authorization and settlement of transactions.

BRIEF SUMMARY

Embodiments of the present invention address these and/or other needs by providing an innovative system, method and computer program product for operatively connecting with a block chain distributed network and using the block chain distributed network for validation of a payment transaction.

According to embodiments of the invention, a system includes a memory device and a processing device operatively coupled to the memory device, where the processing device is configured to execute computer-readable program code to receive a transaction record associated with a payment transaction, wherein the transaction record comprises transaction data indicating a payor, a payee and an amount; access a distributed ledger stored in the memory device, wherein the distributed ledger is updated based on communications from a block chain distributed network; and, using payment transaction logic, determine whether the transaction record represents a valid transaction.

In some embodiments, the processing device is configured to execute computer-readable program code further to determine that the transaction record represents a valid transaction by determining that the transaction record involves a valid payment instrument having associated funds greater than or equal to the amount indicated in the transaction data.

In some embodiments, the processing device is configured to execute computer-readable program code further to communicate the transaction record to an originating node for validation of the transaction record. In some such embodiments, the processing device is configured to execute computer-readable program code further to communicate validation of the transaction record to the block chain distributed network. In other embodiments, the processing device is configured to execute computer-readable program code further to update the distributed ledger with information indicating validation of the transaction record and provide access to the distributed ledger to the block chain distributed network. In yet other embodiments, the processing device is configured to execute computer-readable program code further to initiate crediting the amount to an account of the payee indicated by the transaction record. In some of these embodiments, the processing device is configured to execute computer-readable program code further to update the distributed ledger with information indicating crediting of the amount to an account of the payee indicated by the transaction record and provide access to the distributed ledger to the block chain distributed network.

In some embodiments, the transaction record is encrypted and the processing device is configured to execute computer-readable program code further to decrypt the transaction record.

In some embodiments, the processing device is configured to execute computer-readable program code further to determine that the transaction record represents an invalid transaction by determining that the transaction record involves an invalid payment instrument having associated funds less than or equal to the amount indicated in the transaction data.

According to embodiments of the invention, a method for execution on a system operatively connected with a block chain distributed network, the method for using the block chain distributed network for validation of a payment transaction includes receiving, by the system, a transaction record associated with a payment transaction, wherein the transaction record comprises transaction data indicating a payor, a payee and an amount; accessing, by the system, a distributed ledger stored in the memory device, wherein the distributed ledger is updated based on communications from a block chain distributed network; and, using payment transaction logic, determining, by the system, whether the transaction record represents a valid transaction.

In some embodiments, the method includes determining that the transaction record represents a valid transaction by determining that the transaction record involves a valid payment instrument having associated funds greater than or equal to the amount indicated in the transaction data.

In some embodiments, the method includes communicating the transaction record to an originating node for validation of the transaction record. In some such embodiments, the method includes communicating validation of the transaction record to the block chain distributed network. In other such embodiments, the method includes updating the distributed ledger with information indicating validation of the transaction record and provide access to the distributed ledger to the block chain distributed network. In other such embodiments, the method includes initiating crediting the amount to an account of the payee indicated by the transaction record. In some of these embodiments, the method includes updating the distributed ledger with information indicating crediting of the amount to an account of the payee indicated by the transaction record and provide access to the distributed ledger to the block chain distributed network.

In some embodiments, the transaction record is encrypted and the processing device is configured to execute computer-readable program code further to decrypt the transaction record.

In some embodiments, the method includes determining that the transaction record represents an invalid transaction by determining that the transaction record involves an invalid payment instrument having associated funds less than or equal to the amount indicated in the transaction data.

According to embodiments of the invention, a computer program product for execution on a system operatively connected with a block chain distributed network and for using the block chain distributed network for validation of a payment transaction has at least one non-transitory computer-readable medium having computer-readable program code portions embodied therein. The computer-readable program code portions include an executable portion configured to receive a transaction record associated with a payment transaction, wherein the transaction record comprises transaction data indicating a payor, a payee and an amount; an executable portion configured to access a distributed ledger stored in the memory device, wherein the distributed ledger is updated based on communications from a block chain distributed network; and an executable portion configured to, using payment transaction logic, determine whether the transaction record represents a valid transaction.

In some embodiments, the computer-readable program code portions further comprise an executable portion configured to determine that the transaction record represents a valid transaction by determining that the transaction record involves a valid payment instrument having associated funds greater than or equal to the amount indicated in the transaction data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
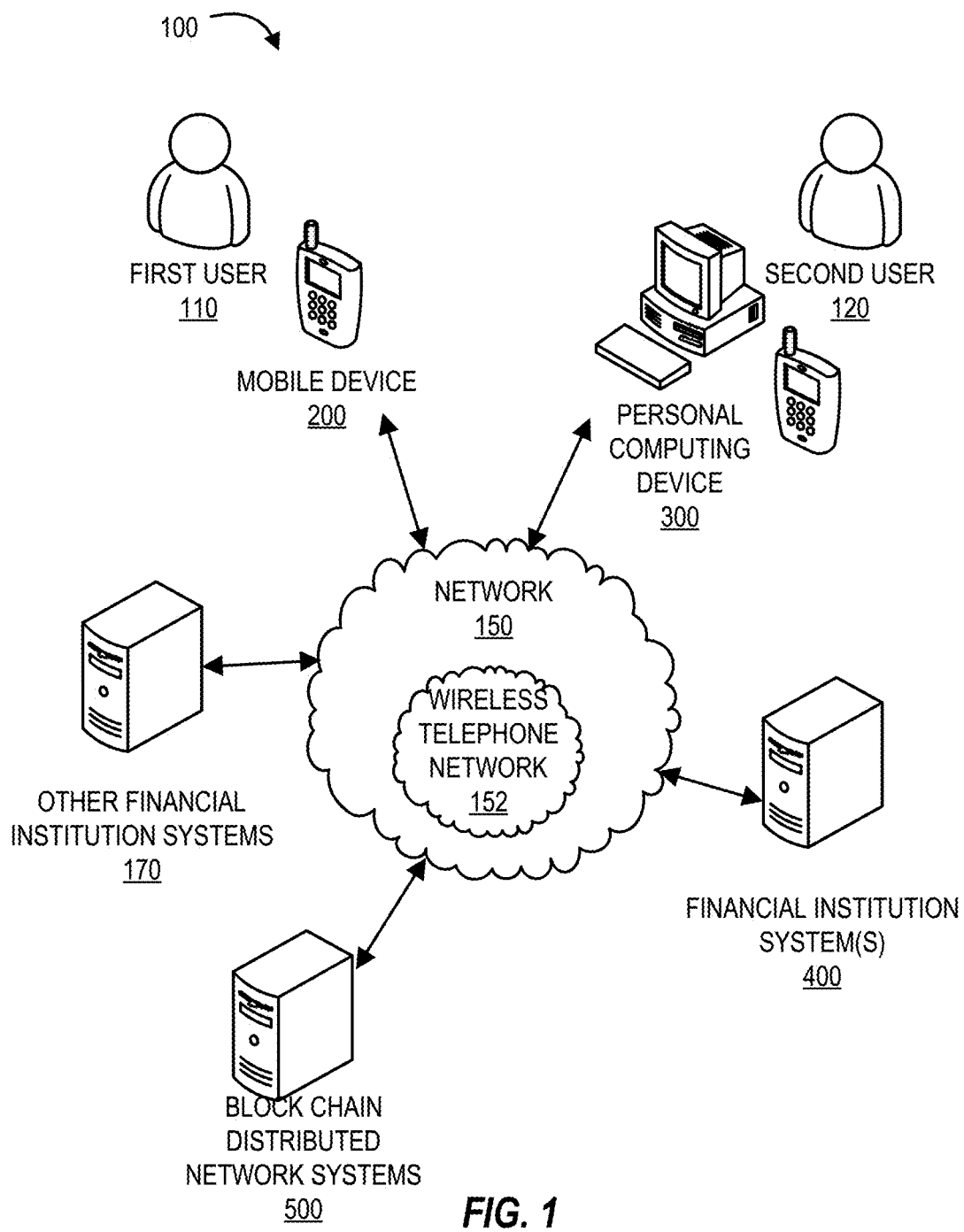
Figure 2:
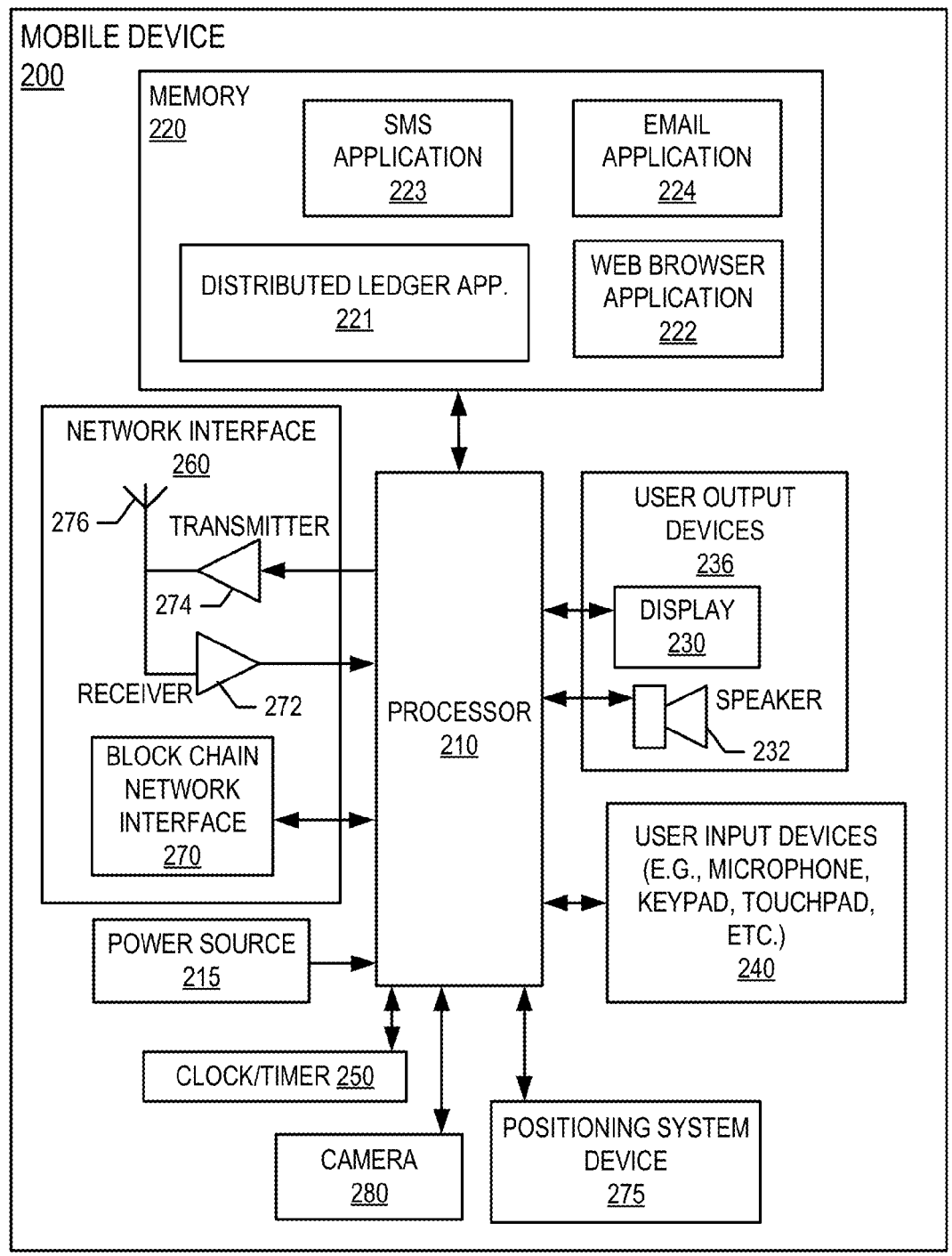
Figure 3:
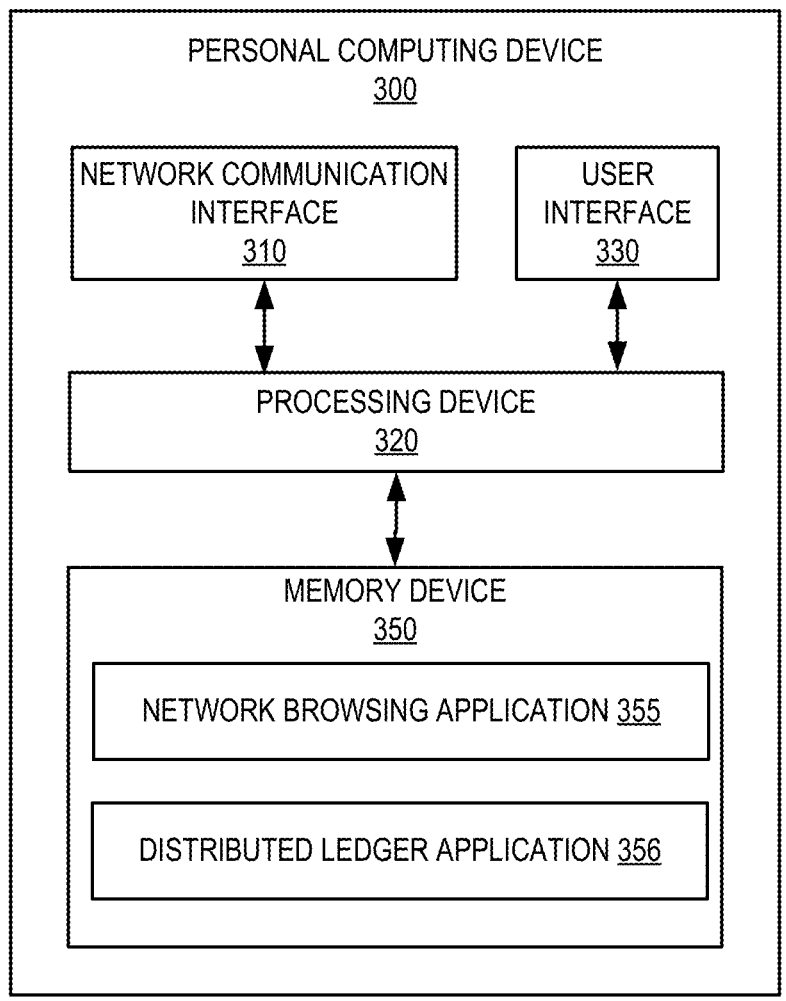
Figure 4:
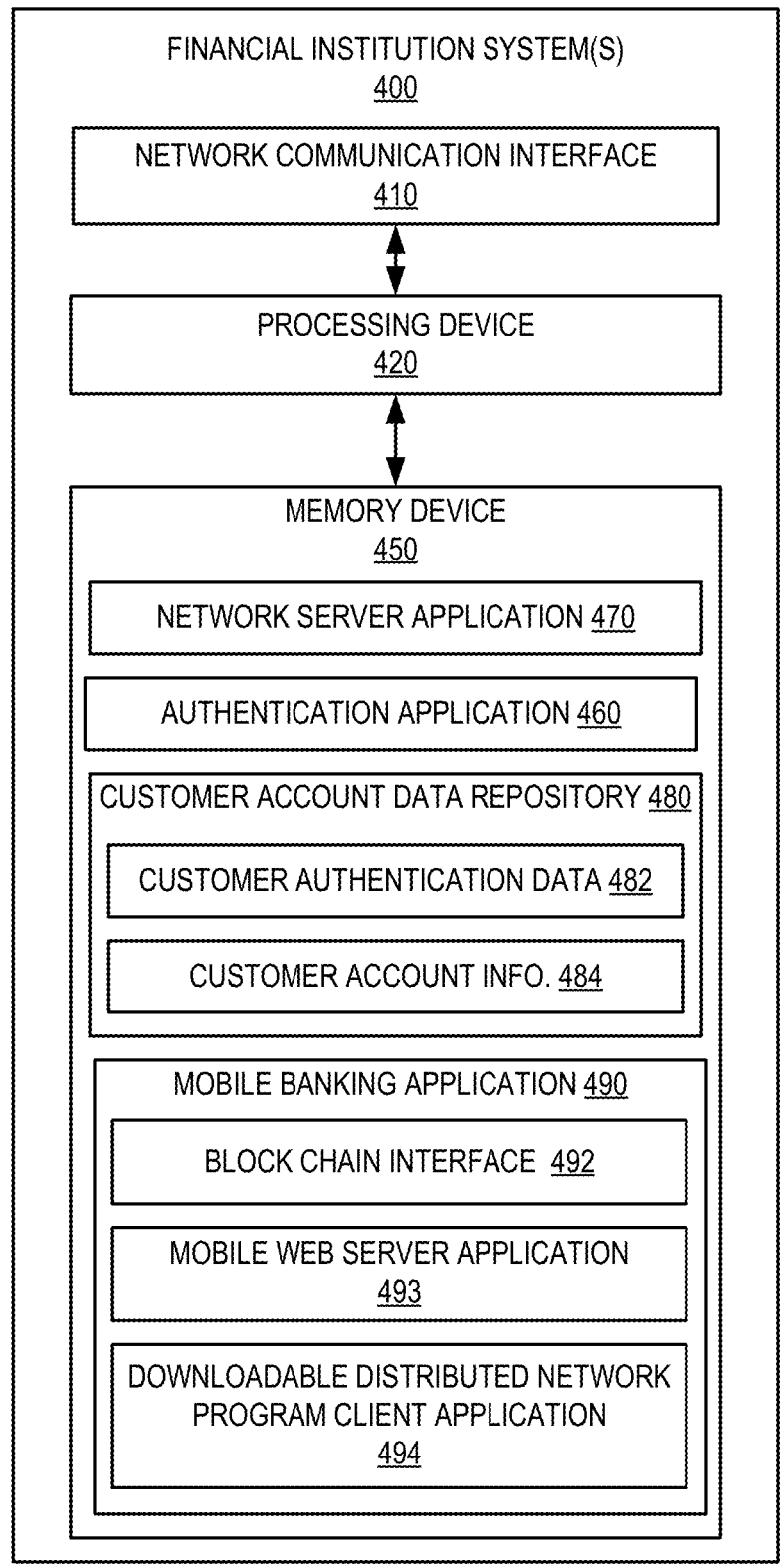
Figure 5:
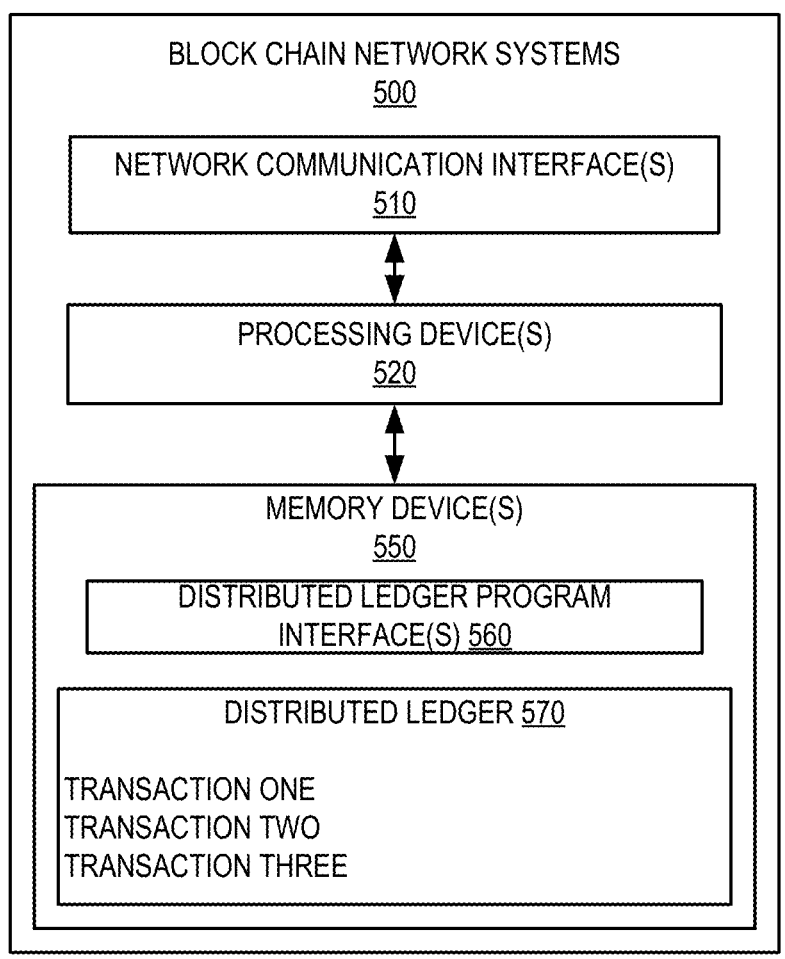
Figure 6A:
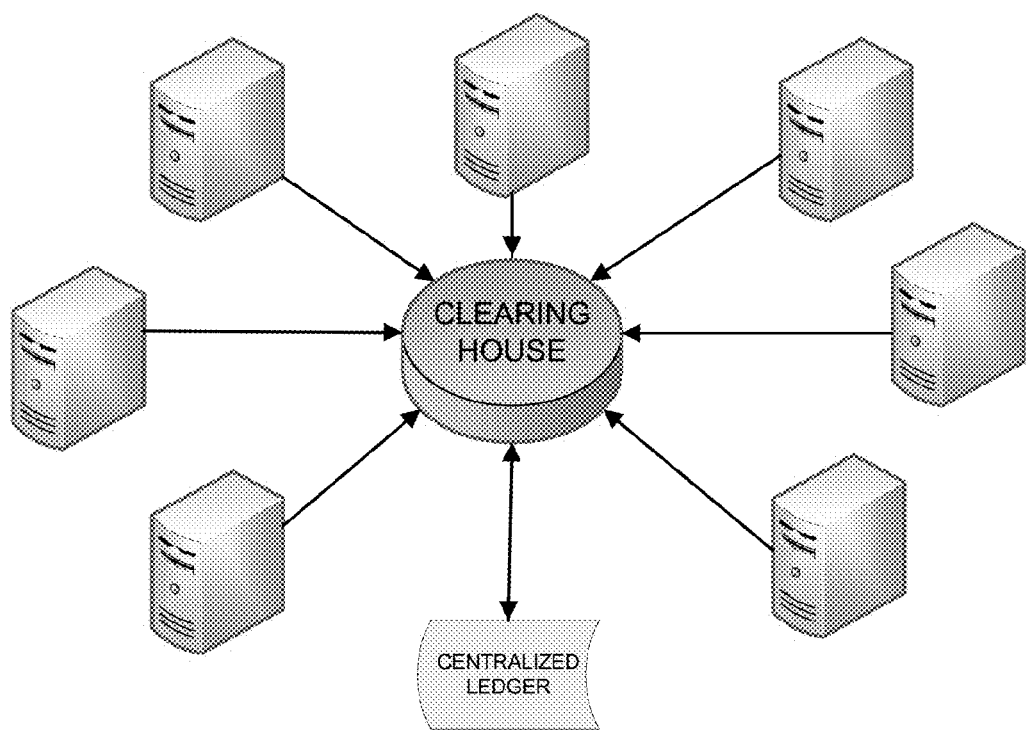
Figure 6B:
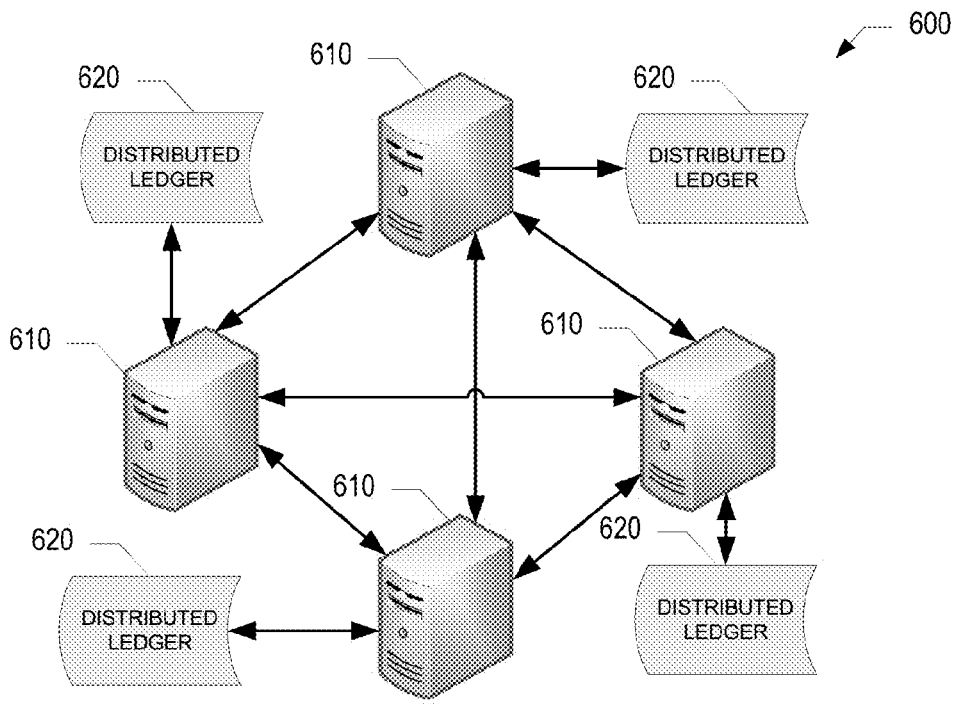
Figure 7:
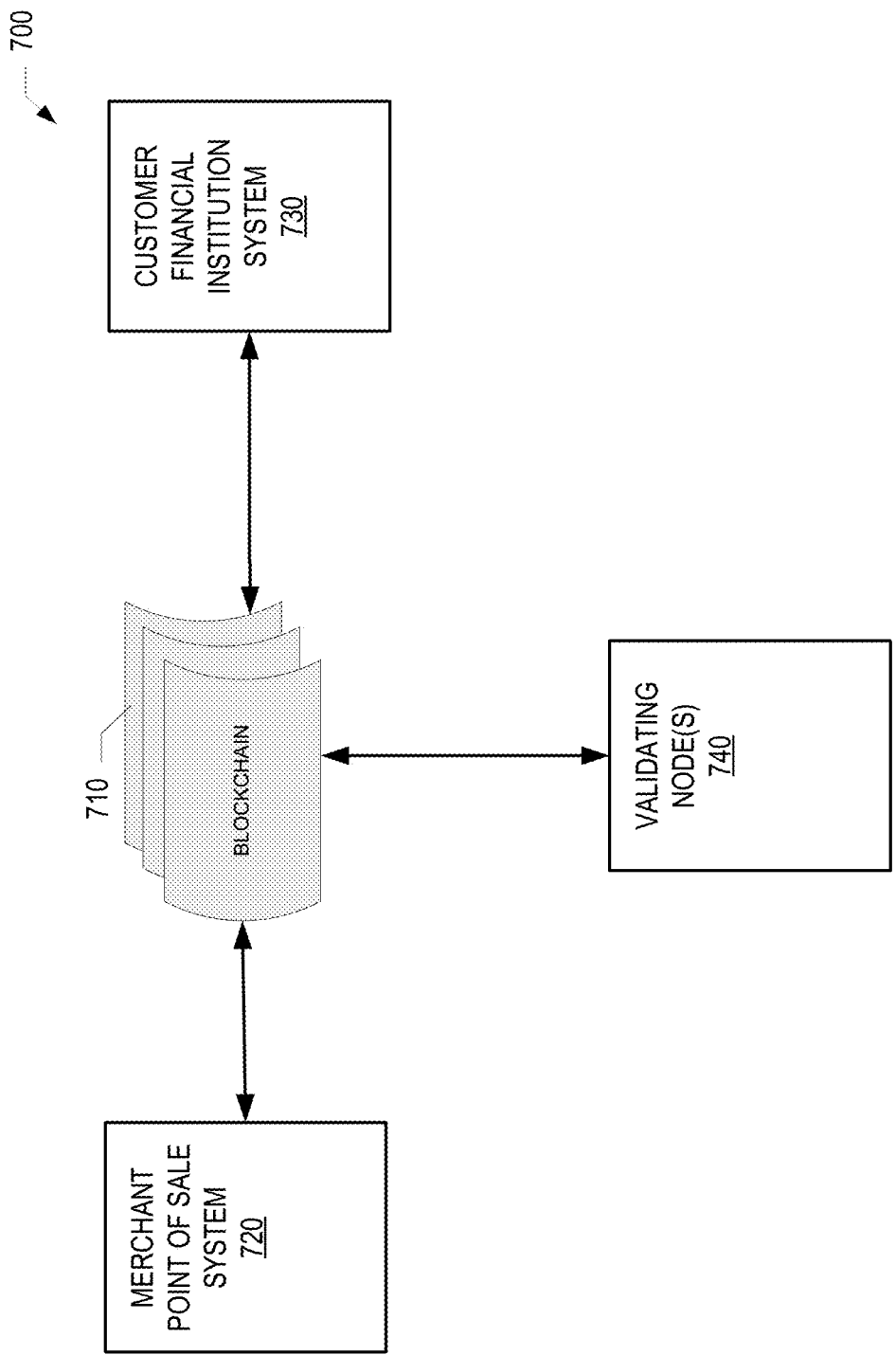
Figure 8:
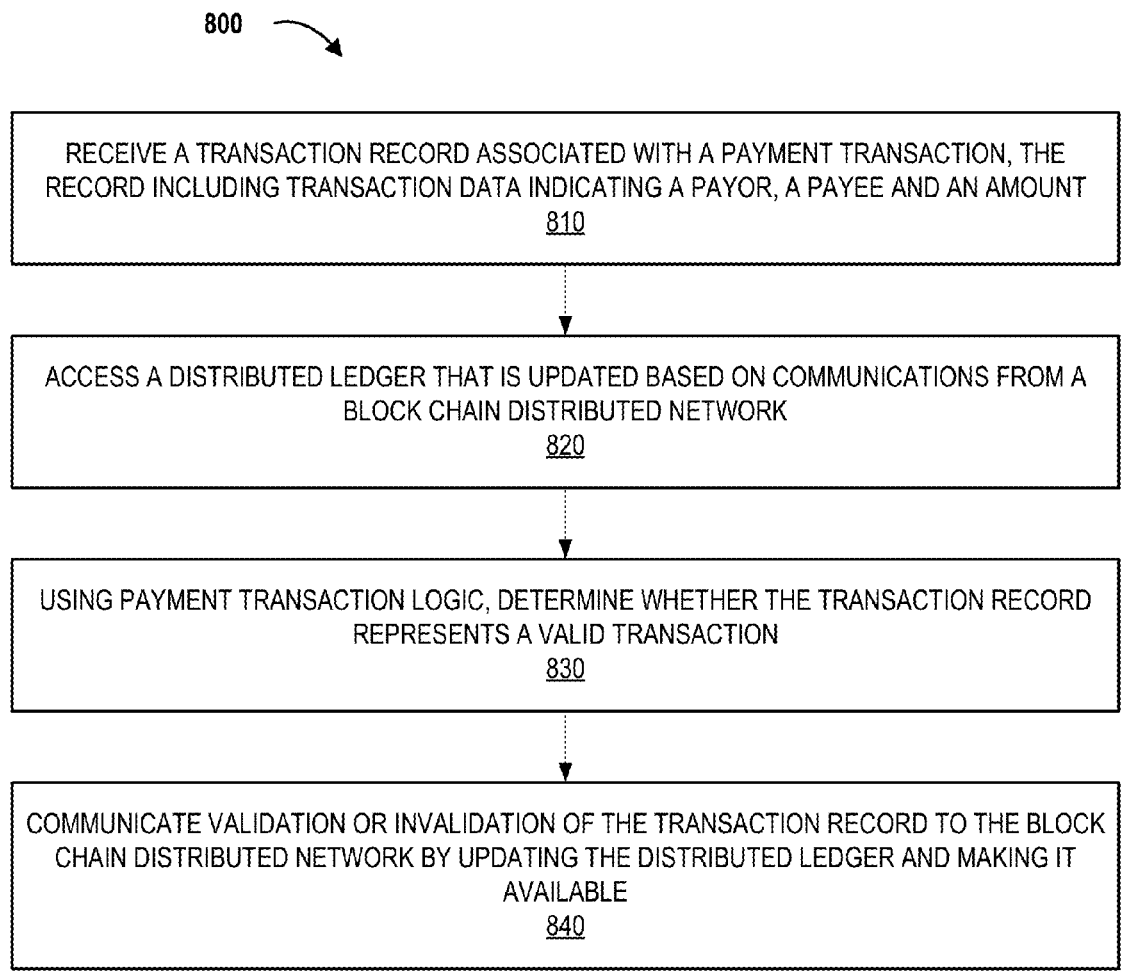
Figure 9:
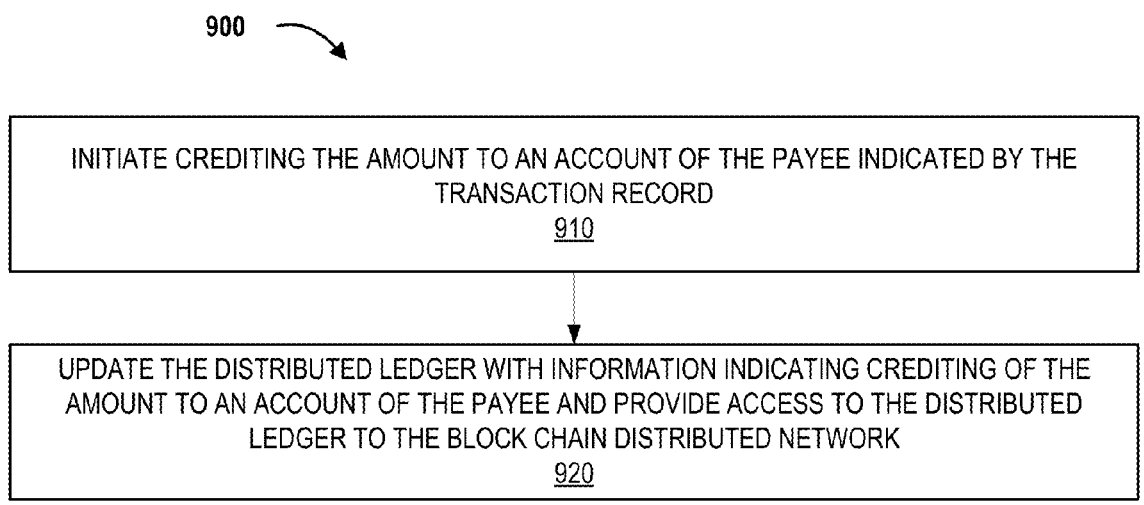
Figure 10:
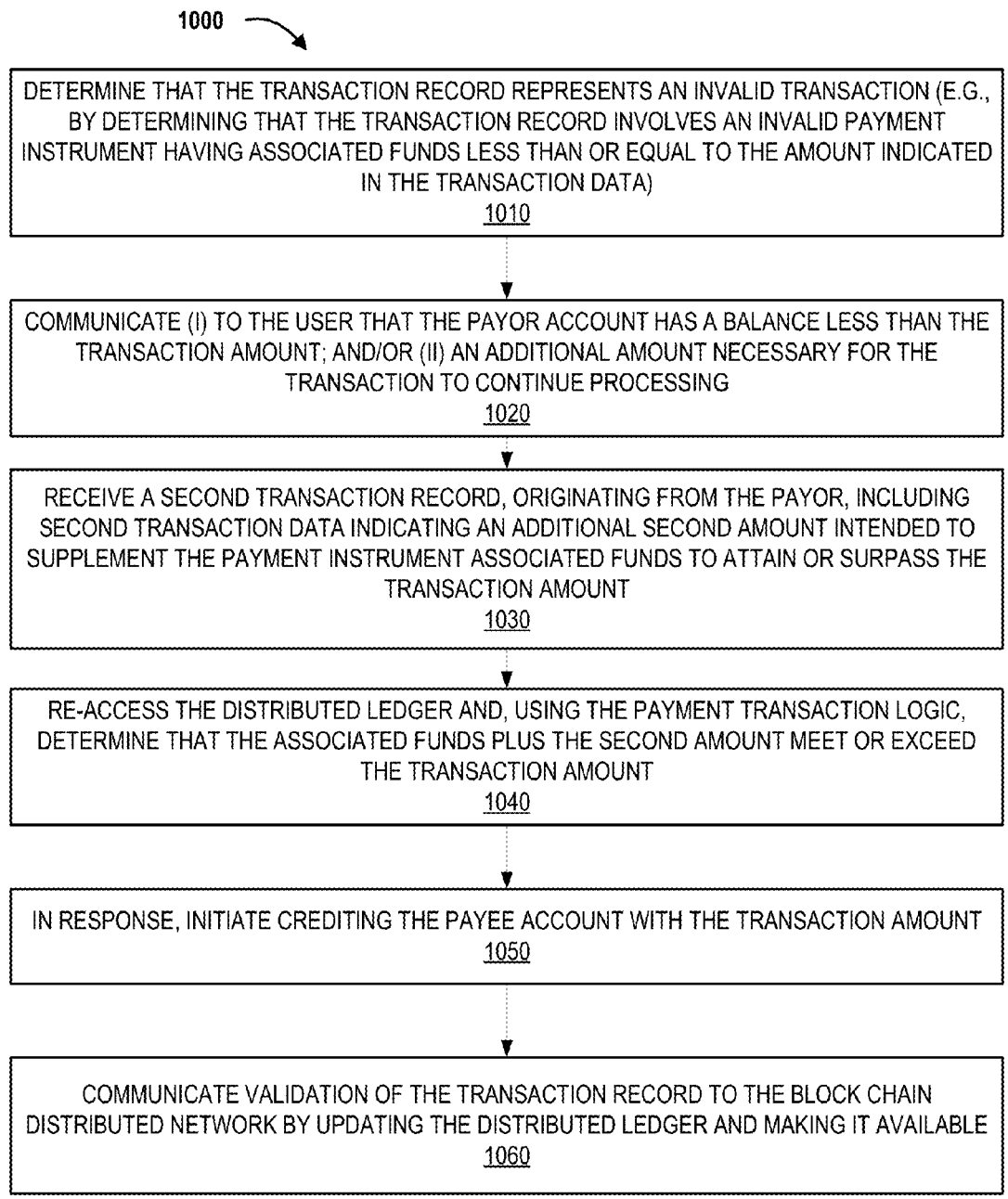
Figure 11A:
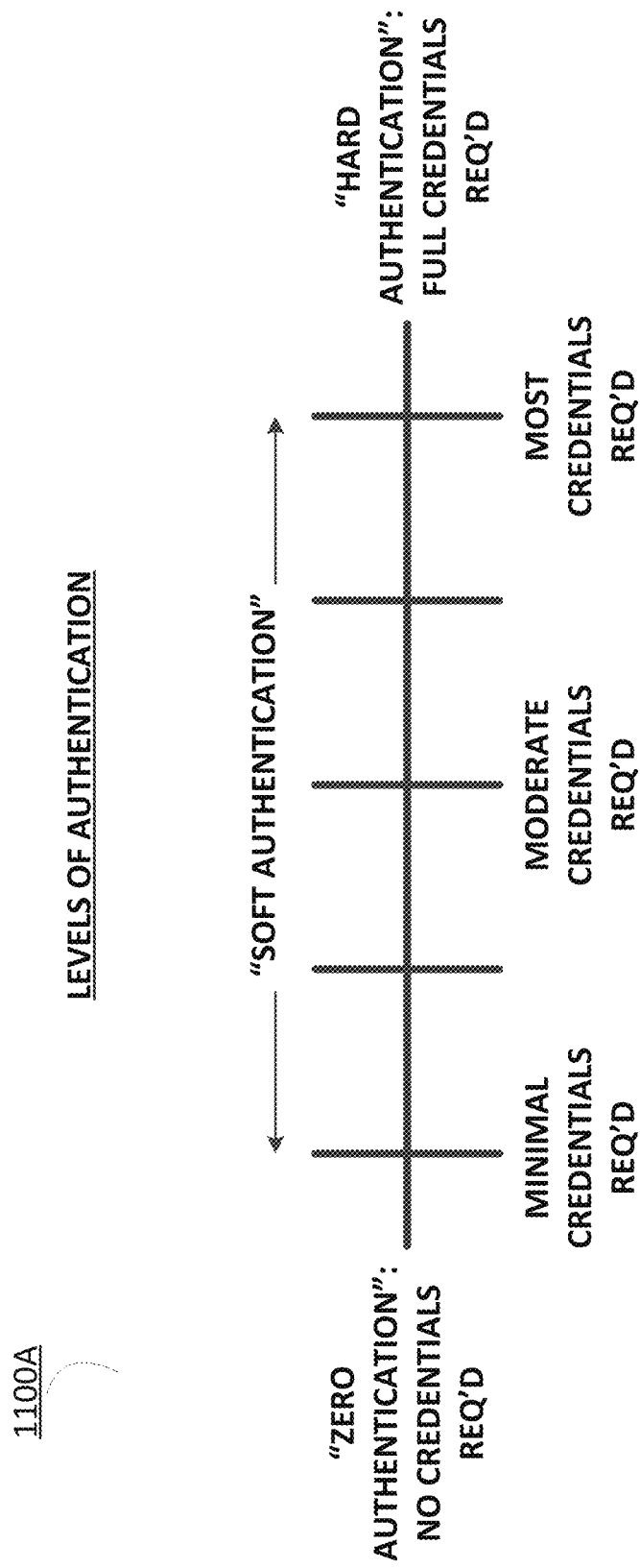
Figure 11B:
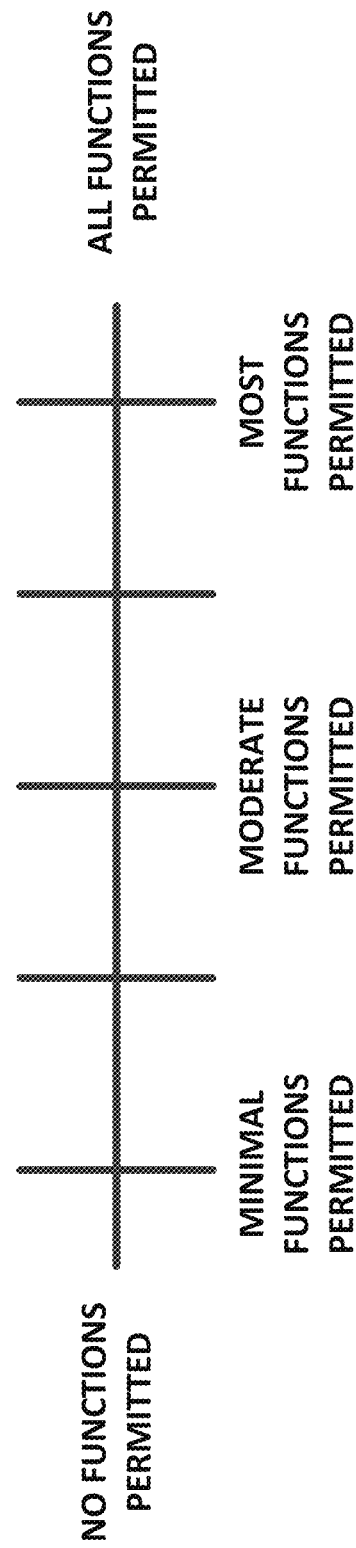
Figure 11C:
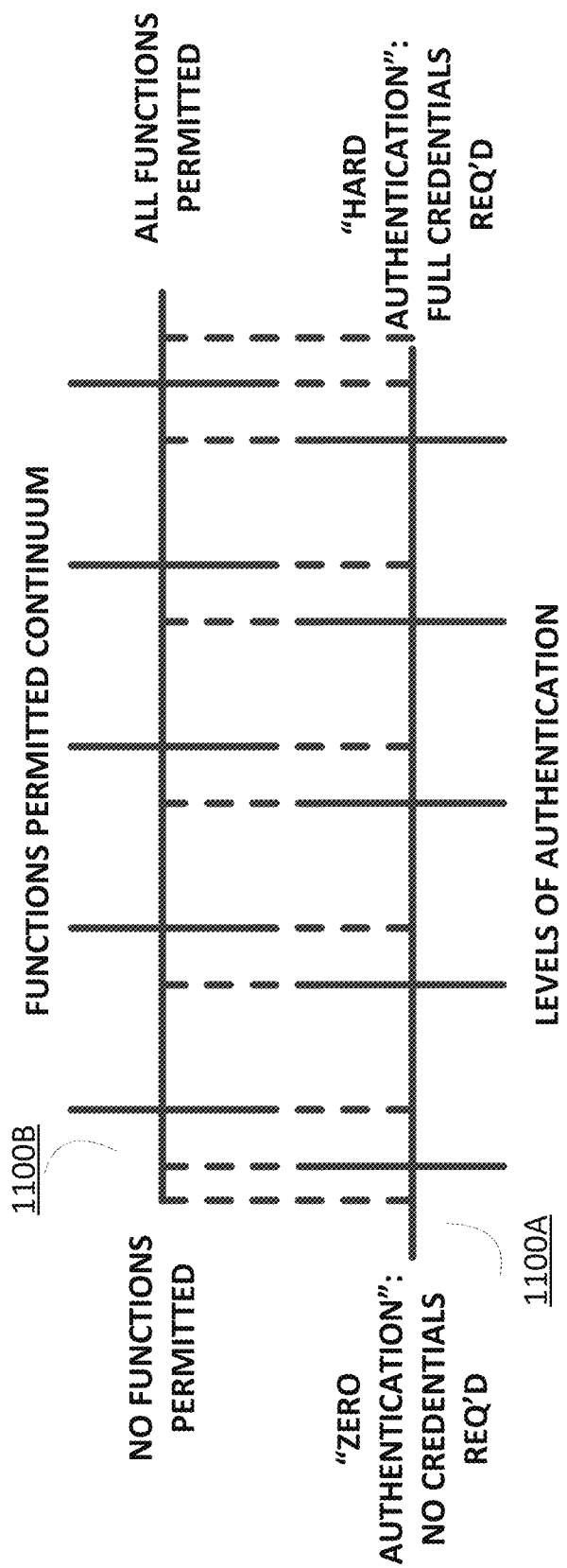
Figure 11D:
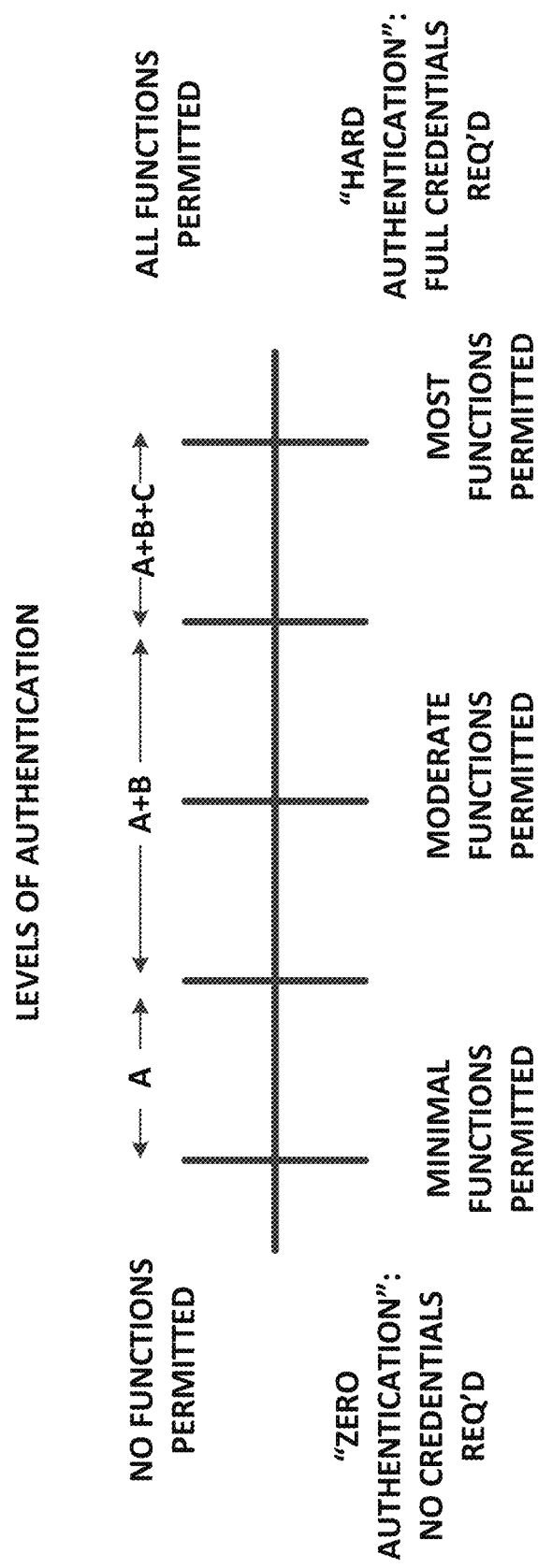

Having thus described embodiments of the invention in general terms, reference will now be made the accompanying drawings, wherein:

FIG. 1 provides a block diagram illustrating a block chain distributed network system and environment, in accordance with embodiments of the invention;

FIG. 2 provides a block diagram illustrating a first user's mobile computing device of FIG. 1, in accordance with embodiments of the invention;

FIG. 3 provides a block diagram illustrating a second user's personal computing device of FIG. 1, in accordance with embodiments of the invention;

FIG. 4 provides a block diagram illustrating the financial institution system(s) of FIG. 1, in accordance with embodiments of the invention;

FIG. 5 provides a block diagram illustrating the block chain network systems of FIG. 1, in accordance with embodiments of the invention;

FIG. 6A is a diagram illustrating a centralized clearinghouse network configuration, in accordance with embodiments of the invention;

FIG. 6B is a diagram illustrating a decentralized block chain network configuration, in accordance with embodiments of the invention;

FIG. 7 is a combined flowchart and diagram illustrating a process and system for using a block chain distributed network for validation of a payment transaction in accordance with embodiments of the invention;

FIG. 8 is a flowchart illustrating a method for using a block chain distributed network for validation of a payment transaction in accordance with embodiments of the invention;

FIG. 9 is a flowchart illustrating a method for using a block chain distributed network for settlement of a payment transaction in accordance with embodiments of the invention;

FIG. 10 is a flowchart illustrating a method for using a block chain distributed network for processing an invalid transaction in accordance with embodiments of the invention;

FIG. 11A presents an illustration of the authentication continuum in accordance to one embodiment of the invention;

FIG. 11B presents an illustration of the application functions permitted continuum in accordance to one embodiment of the invention;

FIG. 11C presents an illustration of the coupling of the application functions permitted continuum and the levels of authentication continuum in accordance to one embodiment of the invention; and FIG. 11D presents an illustration of the relationship between the functions permitted and the authentication types in accordance to one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "financial institution" and "financial entity" include any organization that processes financial transactions including, but not limited to, banks, credit unions, savings and loan associations, investment companies, stock brokerages, assess management firms, insurance companies and the like. In specific embodiments of the invention, use of the term "bank" is limited to a financial entity in which account-bearing customers conduct financial transactions, such as account deposits, withdrawals, transfers and the like.

Embodiments of the present invention provide a system and method for using a block chain configuration to implement a distributed ledger across multiple network nodes. Embodiments of the invention enable a system operatively connected with a block chain distributed network to use the block chain distributed network for validation (i.e., authorization) of a payment transaction. The system receives a transaction record associated with a payment transaction, wherein the transaction record comprises transaction data indicating a payor, a payee and an amount; accesses a distributed ledger stored in the memory device, wherein the distributed ledger is updated based on communications from a block chain distributed network; and, using payment transaction logic, determines whether the transaction record represents a valid transaction by, e.g., communicate the transaction record to a validating node for validation of the transaction record. Once validated, the system (or validating node) communicates validation of the transaction record to the block chain distributed network, e.g., by updating the distributed ledger with information indicating validation of the transaction record and providing access to the distributed ledger to the network.

In some cases, the system also facilitates settlement of the transaction by initiating crediting the amount to an account of the payee indicated by the transaction record and updating the distributed ledger with information indicating crediting of the amount to an account of the payee indicated by the transaction record and provide access to the distributed ledger to the block chain distributed network.

Block Chain Distributed Ledger System and Environment

FIG. 1 provides a block diagram illustrating a block chain distributed ledger system and environment 100, in accordance with an embodiment of the invention. As illustrated in FIG. 1, the environment 100 includes a first user 110 and/or a second user 120 where the users represent customers of one or more financial institution(s). A user of the system may be a person, but may also be a business (e.g., a merchant) or any other entity.

The environment 100 also may include a mobile device 200 and a personal computing device 300 for use by the first user 110 and second user 120, respectively. The personal computing device 300 may be any device that employs a processor and memory and can perform computing functions, such as a personal computer or a mobile device. As used herein, a "mobile device" 200 is any mobile communication device, such as a cellular telecommunications device (i.e., a cell phone or mobile phone), personal digital assistant (PDA), a mobile Internet accessing device, or other mobile device.

The mobile device 200 and the personal computing device 300 are configured to communicate over a network 150 with a financial institution system(s) 400 and, in some cases, one or more other financial institution systems 170 and with the blockchain, as represented by the block chain distributed network systems 500. The first user's mobile device 200, the second user's personal computing device 300, the financial institution system(s) 400, the block chain distributed network systems 500, and any other participating financial institution systems 170 are each described in greater detail below with reference to FIGS. 2-5. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In one embodiment, the network 150 includes a wireless telephone network 152.

In general, a mobile device 200 is configured to connect with the network 150 to log the first user 110 into a block chain interface 492 of the financial institution system(s) 400 and/or the block chain distributed network systems 500 (i.e., "block chain systems 500). A user, in order to access the first user's account(s), online banking application and/or mobile banking application on the financial institution system(s) 400 must authenticate with the financial institution system(s) 400 and/or another system. Similarly, in some embodiments, in order to access the distributed ledger(s) of the block chain systems 500, a user must authenticate with the financial institution system(s) 400 and/or another system, such as one of the block chain systems 500. For example, logging into the financial institution system(s) 400 generally requires that the first user 110 authenticate his/her identity using a user name, a passcode, a cookie, a biometric identifier, a private key, a token, and/or another authentication mechanism that is provided by the first user 110 to the financial institution system(s) 400 via the mobile device 200.

The financial institution system(s) 400 are in network communication with other devices, such as other financial institutions' transaction/banking systems 170, block chain systems 500, and a personal computing device 300 that is configured to communicate with the network 150 to log a second user 120 into the financial institution system(s) 400. In one embodiment, the invention may provide an application download server such that software applications that support the financial institution system(s) 400 can be downloaded to the mobile device 200.

In some embodiments of the invention, the application download server is configured to be controlled and managed by one or more third-party data providers (not shown in FIG. 1) over the network 150. In other embodiments, the application download server is configured to be controlled and managed over the network 150 by the same entity or entities that maintains the financial institution system(s) 400.

In some embodiments of the invention, the block chain systems 500 are configured to be controlled and managed by one or more third-party data providers (not shown), financial institutions or other entities over the network 150. In other embodiments, the block chain systems 500 are configured to be controlled and managed over the network 150 by the same entity that maintains the financial institution system(s) 400.

FIG. 2 provides a block diagram illustrating a user's mobile device 200 of FIG. 1 in more detail, in accordance with embodiments of the invention. In one embodiment of the invention, the mobile device 200 is a mobile telephone. However, it should be understood that a mobile telephone is merely illustrative of one type of mobile device 200 that may benefit from, employ, or otherwise be involved with embodiments of the present invention and, therefore, should not be taken to limit the scope of embodiments of the present invention. Other types of mobile devices 200 may include portable digital assistants (PDAs), pagers, mobile televisions, gaming devices, laptop computers, cameras, video recorders, audio/video player, radio, GPS devices, or any combination of the aforementioned.

Some embodiments of the mobile device 200 include a processor 210 communicably coupled to such devices as a memory 220, user output devices 236, user input devices 240, a network interface 260, a power source 215, a clock or other timer 250, a camera 280, and a positioning system device 275. The processor 210, and other processors described herein, generally include circuitry for implementing communication and/or logic functions of the mobile device 200. For example, the processor 210 may include a digital signal processor device, a microprocessor device, and various analog to digital converters, digital to analog converters, and/or other support circuits. Control and signal processing functions of the mobile device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 222. The web browser application 222 may then allow the mobile device 200 to transmit and receive web content, such as, for example, location-based content and/or other web page content, according to a Wireless Application Protocol (WAP), Hypertext Transfer Protocol (HTTP), and/or the like.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the mobile device 200 may be configured to operate with one or more air interface standards, communication protocols, modulation types, and access types. By way of illustration, the mobile device 200 may be configured to operate in accordance with any of a number of first, second, third, and/or fourth-generation communication protocols and/or the like. For example, the mobile device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The mobile device 200 may also be configured to operate in accordance with non-cellular communication mechanisms, such as via a wireless local area network (WLAN) or other communication/data networks.

The network interface 260 may also include a block chain network interface 270. The block chain network interface 270 may include software, such as encryption software, and hardware, such as a modem, for communicating information to and/or from one or more devices on a network 150 and connected with or that are part of the block chain systems 500. For example, the mobile device 200 may be configured so that it can be used as an interface for interacting with the block chain for inputting information involving a transaction record. For example, the mobile device 200 may wirelessly communicate encrypted transaction information to a terminal of the network 150 or the block chain systems 500 such as a merchant system or point of sale.

As described above, the mobile device 200 has a user interface that is, like other user interfaces described herein, made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the mobile device 200 to receive data from a user such as the first user 110, may include any of a number of devices allowing the mobile device 200 to receive data from a user, such as a keypad, keyboard, touch-screen, touchpad, microphone, mouse, joystick, other pointer device, button, soft key, and/or other input device(s). The user interface may also include a camera 280, such as a digital camera.

The mobile device 200 may also include a positioning system device 275 that is configured to be used by a positioning system to determine a location of the mobile device 200. For example, the positioning system device 275 may include a GPS transceiver. In some embodiments, the positioning system device 275 is at least partially made up of the antenna 276, transmitter 274, and receiver 272 described above. For example, in one embodiment, triangulation of cellular signals may be used to identify the approximate location of the mobile device 200. In other embodiments, the positioning system device 275 includes a proximity sensor or transmitter, such as an RFID tag, that can sense or be sensed by devices known to be located proximate a merchant or other location to determine that the mobile device 200 is located proximate these known devices. Such information may be used by embodiments of the invention in order to influence which validating nodes of the block chain network are used for validation of the transaction record. For example, validating nodes in geographic proximity to the transaction may be used or not used. Using validating nodes close in proximity to the transaction may provide a greater chance for successful validation/invalidation of the record. That is, such nodes may have more information on which to base a validation or invalidation of the record. Conversely, in an interest of ensuring minimal bias, validating nodes farther away from a transaction may be used.

The mobile device 200 further includes a power source 215, such as a battery, for powering various circuits and other devices that are used to operate the mobile device 200. Embodiments of the mobile device 200 may also include a clock or other timer 250 configured to determine and, in some cases, communicate actual or relative time to the processor 210 or one or more other devices.

The mobile device 200 also includes a memory 220 operatively coupled to the processor 210. As used herein, memory includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like.

The memory 220 can store any of a number of applications which comprise computer-executable instructions/code executed by the processor 210 to implement the functions of the mobile device 200 and/or one or more of the process/method steps described herein. For example, the memory 220 may include such applications as a conventional web browser application 222 and/or a distributed ledger application 221. These applications also typically provide a graphical user interface (GUI) on the display 230 that allows the first user 110 to communicate with the mobile device 200, the financial institution system(s) 400, and/or other devices or systems. In one embodiment of the invention, when the first user 110 decides to participate in his bank's mobile banking application, the mobile device 200 downloads or otherwise obtains the distributed ledger application 221 from the financial institution system(s) 400, from the block chain systems 500 or from a distinct application server. In other embodiments of the invention, the first user 110 interacts with the financial institution system(s) 400 or the block chain systems 500 via the web browser application 222 in addition to, or instead of, the distributed ledger application 221.

The memory 220 can also store any of a number of pieces of information, and data, used by the mobile device 200 and the applications and devices that make up the mobile device 200 or are in communication with the mobile device 200 to implement the functions of the mobile device 200 and/or the other systems described herein. For example, the memory 220 may include such data as user authentication information, etc.

Referring now to FIG. 3, the personal computing device 300 associated with the second user 120 also includes various features, such as a network communication interface 310, a processing device 320, a user interface 330, and a memory device 350. The network communication interface 310 includes a device that allows the personal computing device 300 to communicate over the network 150 (shown in FIG. 1). In one embodiment of the invention, a network browsing application 355 enables a user to establish network communication with a financial institution system(s) 400 and/or the block chain systems 500 (shown in FIG. 1) for the purpose of conducting a transaction (or communicating transaction information for authorization/settlement) in accordance with embodiments of the invention.

As used herein, a "processing device," such as the processing device 320, generally refers to a device or combination of devices having circuitry used for implementing the communication and/or logic functions of a particular system. For example, a processing device 320 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 320 may further include functionality to operate one or more software programs based on computer-executable program code thereof, which may be stored in a memory. As the phrase is used herein, a processing device 320 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 330 generally includes a plurality of interface devices and/or software that allow a customer to input commands and data to direct the processing device to execute instructions. For example, the user interface 330 presented in FIG. 3 may include a graphical user interface (GUI) or an interface to input computer-executable instructions that direct the processing device 320 to carry out specific functions. The user interface 330 employs certain input and output devices to input data received from the first user 110 or second user 120 or output data to the first user 110 or second user 120. These input and output devices may include a display, mouse, keyboard, button, touchpad, touch screen, microphone, speaker, LED, light, joystick, switch, buzzer, bell, and/or other customer input/output device for communicating with one or more customers.

As used herein, a "memory device" 350 generally refers to a device or combination of devices that store one or more forms of computer-readable media for storing data and/or computer-executable program code/instructions. Computer-readable media is defined in greater detail below. For example, in one embodiment, the memory device 350 includes any computer memory that provides an actual or virtual space to temporarily or permanently store data and/or commands provided to the processing device 320 when it carries out its functions described herein.

FIG. 4 provides a block diagram illustrating the financial institution system(s) 400, in greater detail, in accordance with embodiments of the invention. As illustrated in FIG. 4, in one embodiment of the invention, the financial institution system(s) 400 include one or more processing devices 420 operatively coupled to a network communication interface 410 and a memory device 450. In certain embodiments, the financial institution system(s) 400 are operated by a first entity, such as a financial institution, while in other embodiments, the financial institution system(s) 400 are operated by an entity other than a financial institution.

It should be understood that the memory device 450 may include one or more databases or other data structures/repositories. The memory device 450 also includes computer-executable program code that instructs the processing device 420 to operate the network communication interface 410 to perform certain communication functions of the financial institution system(s) 400 described herein. For example, in one embodiment of the financial institution system(s) 400, the memory device 450 includes, but is not limited to, a network server application 470, an authentication application 460, a customer account data repository 480 which includes customer authentication data 480 and customer account information 484, a mobile banking application 490 which includes a block chain interface 492, a mobile web server application 493, a downloadable distributed ledger application 494 and other computer-executable instructions or other data. The computer-executable program code of the network server application 470, the authentication application 460, or the mobile banking application 490 may instruct the processing device 420 to perform certain logic, data-processing, and data-storing functions of the financial institution system(s) 400 described herein, as well as communication functions of the financial institution system(s) 400.

In one embodiment, the customer account data repository 480 includes customer authentication data 482 and customer account information 484. The network server application 470, the authentication application 460, and the mobile banking application 490 are configured to invoke or use the customer account information 484, the customer authentication data 482, and the block chain interface 492 when authenticating a user to the financial institution system(s) 400 and/or the block chain systems 500.

As used herein, a "communication interface" generally includes a modem, server, transceiver, and/or other device for communicating with other devices on a network, and/or a user interface for communicating with one or more customers. Referring again to FIG. 4, the network communication interface 410 is a communication interface having one or more communication devices configured to communicate with one or more other devices on the network 450, such as the mobile device 200, the personal computing device 300, the other financial institution banking systems 170, and the block chain systems 500. The processing device 420 is configured to use the network communication interface 410 to transmit and/or receive data and/or commands to and/or from the other devices connected to the network 150.

FIG. 5 provides a block diagram illustrating block chain network systems 500, in accordance with embodiments of the invention. As discussed with reference to FIG. 6B below, embodiments of the block chain may include multiple systems, servers, computers or the like maintained by one or many entities. FIG. 5 merely illustrates one of those systems that, typically, interacts with many other similar systems to form the block chain. In one embodiment of the invention, the block chain network systems 500 are operated by a second entity that is a different or separate entity from the first entity (e.g., the financial institution) that, in one embodiment of the invention, implements the financial institution system(s) 400. In some embodiments, the financial institution system(s) 400 are part of the block chain. Similarly, in some embodiments, the block chain network systems 500 are part of the financial institution system(s)

400. In other embodiments, the financial institution system(s) 400 are distinct from the block chain network systems 500.

As illustrated in FIG. 5, the one of the block chain network systems 500 generally includes, but is not limited to, a network communication interface 510, a processing device 520, and a memory device 550. The processing device 520 is operatively coupled to the network communication interface 510 and the memory device 550. In one embodiment of the block chain network systems 500, the memory device 550 stores, but is not limited to, a distributed ledger program interface 560 and a distributed ledger 570. In some embodiments, the distributed ledger 570 stores data including, but not limited to, information related to transaction one, transaction two, transaction three, etc. In one embodiment of the invention, both the distributed ledger program interface 560 and the distributed ledger 570 may associate with applications having computer-executable program code that instructs the processing device 520 to operate the network communication interface 510 to perform certain communication functions involving the distributed ledger 570 described herein. In one embodiment, the computer-executable program code of an application associated with the distributed ledger 570 may also instruct the processing device 520 to perform certain logic, data processing, and data storing functions of the application associated with the distributed ledger 570 described herein.

The network communication interface 510 is a communication interface having one or more communication devices configured to communicate with one or more other devices on the network 150. The processing device 520 is configured to use the network communication interface 510 to receive information from and/or provide information and commands to a mobile device 200, a personal computing device 300, other financial institution systems 170, other block chain network systems 500, the financial institution system(s) 400 and/or other devices via the network 150. In some embodiments, the processing device 520 also uses the network communication interface 510 to access other devices on the network 150, such as one or more web servers of one or more third-party data providers. In some embodiments, one or more of the devices described herein may be operated by a second entity so that the second entity controls the various functions involving the block chain network systems 500. For example, in one embodiment of the invention, although the financial institution system(s) 400 are operated by a first entity (e.g., a financial institution), a second entity operates one or more of the block chain network systems 500 that store various copies of the distributed ledger 570.

As described above, the processing device 520 is configured to use the network communication interface 510 to gather data, such as data corresponding to transactions, blocks or other updates to the distributed ledger 570 from various data sources such as other block chain network systems 500. The processing device 520 stores the data that it receives in its copy of the distributed ledger 570 stored in the memory device 550.

As discussed above, in some embodiments of the invention, an application server or application download server (not shown) might be provided. The application download server may include a network communication interface, a processing device, and a memory device. The network communication interface and processing device are similar to the previously described network communication interface 410 and the processing device 420 previously described. For example, the processing device is operatively coupled to the network communication interface and the memory device. In one embodiment of the application download server, the memory device includes a network browsing application having computer-executable program code that instructs the processing device to operate the network communication interface to perform certain communication functions of the application download server described herein. In some embodiments of the invention, the application download server provides applications that are to be downloaded to a qualified user's mobile device or personal computing device.

Financial Transaction Validation on the Blockchain

Rather than utilizing a centralized ledger as discussed with reference to some embodiments above and as shown in FIG. 6A, other various embodiments of the invention may use a decentralized block chain configuration or architecture as shown in FIG. 6B in order to facilitate a clearing financial transactions distributed on a block chain distributed network. Such a decentralized block chain configuration ensures accurate mapping of transactions to financial institutions and/or customers. Accordingly, a block chain configuration may be used to maintain an accurate ledger of financial transactions and to provide validation of such transactions.

A block chain or blockchain is a distributed database that maintains a list of data records, the security of which is enhanced by the distributed nature of the block chain. A block chain typically includes several nodes, which may be one or more systems, machines, computers, databases, data stores or the like operably connected with one another. In some cases, each of the nodes or multiple nodes are maintained by different entities. A block chain typically works without a central repository or single administrator. One well-known application of a block chain is the public ledger of transactions for cryptocurrencies such as used in bitcoin. The data records recorded in the block chain are enforced cryptographically and stored on the nodes of the block chain.

A block chain provides numerous advantages over traditional databases. A large number of nodes of a block chain may reach a consensus regarding the validity of a transaction contained on the transaction ledger. Similarly, when multiple versions of a document or transaction exits on the ledger, multiple nodes can converge on the most up-to-date version of the transaction. For example, in the case of a virtual currency transaction, any node within the block chain that creates a transaction can determine within a level of certainty whether the transaction can take place and become final by confirming that no conflicting transactions (i.e., the same currency unit has not already been spent) confirmed by the block chain elsewhere.

The block chain typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, for example, when someone sends cryptocurrency to another person), and blocks are created by users known as "miners" who use specialized software/equipment to create blocks. In some embodiments, the block chain system is closed, as such the number of miners in the current system are known and the system comprises primary sponsors that generate and create the new blocks of the system. As such, any block may be worked on by a primary sponsor. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet and, in some cases, that meets other criteria. In some block chain systems, miners are incentivized to create blocks by a rewards structure that offers a pre-defined per-block reward and/or fees offered within the transactions validated themselves. Thus, when a miner successfully validates a transaction on the block chain, the miner may receive rewards and/or fees as an incentive to continue creating new blocks.

As mentioned above and referring to FIG. 6B, a block chain 600 is typically decentralized—meaning that a distributed ledger 620 (i.e., a decentralized ledger) is maintained on multiple nodes 610 of the block chain 600. One node in the block chain may have a complete or partial copy of the entire ledger or set of transactions and/or blocks on the block chain. Transactions are initiated at a node of a block chain and communicated to the various nodes of the block chain. Any of the nodes can validate a transaction, add the transaction to its copy of the block chain, and/or broadcast the transaction, its validation (in the form of a block) and/or other data to other nodes. This other data may include time-stamping, such as is used in cryptocurrency block chains. In some embodiments, the nodes 610 of the system might be financial institutions that function as gateways for other financial institutions. For example, a credit union might hold the account, but access to the distributed system through a sponsor node.

Various other specific-purpose implementations of block chains have been developed. These include distributed domain name management, decentralized crowd-funding, synchronous/asynchronous communication, decentralized real-time ride sharing and even a general purpose deployment of decentralized applications.

Embodiments of the invention enable a system operatively connected with a block chain distributed network to use the block chain distributed network for validation (i.e., authorization) of a payment transaction. The system receives a transaction record associated with a payment transaction, wherein the transaction record comprises transaction data indicating a payor, a payee and an amount; accesses a distributed ledger stored in the memory device, wherein the distributed ledger is updated based on communications from a block chain distributed network; and, using payment transaction logic, determines whether the transaction record represents a valid transaction by, e.g., communicate the transaction record to a validating node for validation of the transaction record. Once validated, the system (or validating node) communicates validation of the transaction record to the block chain distributed network, e.g., by updating the distributed ledger with information indicating validation of the transaction record and providing access to the distributed ledger to the network.

In some cases, the system also facilitates settlement of the transaction by initiating crediting the amount to an account of the payee indicated by the transaction record and updating the distributed ledger with information indicating crediting of the amount to an account of the payee indicated by the transaction record and provide access to the distributed ledger to the block chain distributed network.

Referring now to FIG. 7, a combined flowchart and diagram illustrating a process and system for using a block chain distributed network for validation of a payment transaction is shown in accordance with embodiments of the invention. As shown, a customer performs an transaction, which can be encrypted and received by a merchant point of sale system 720 placed on a block chain distributed network 710. The blockchain 710 includes or is operatively connected with one or more validating node(s) 740. These validating node(s) 740 may receive the transaction information and validate the transaction, invalidate the transaction or neither. As dictated by a set of rules for the blockchain, once the necessary number of validating node(s) validates the transaction (and, in some cases, the requisite number of invalidating node(s) is not met or exceeded), then the blockchain confirms the validation of the transaction to the merchant. Subsequently, the blockchain also enables settlement of the transaction with the customer's financial institution system (i.e., the issuing bank). In some cases, the results are recorded on the block chain, which provides visibility and accountability into the operation of the transactions to other members of the blockchain 710. In some cases, some or none of the results of the transaction are recorded on the blockchain, depending on desired privacy levels and/or rules of processing.

Referring now to FIG. 8, a flowchart illustrating method for using a block chain distributed network for validation of a payment transaction is shown in accordance with embodiments of the invention. The first step, as represented by block 810, is to receive a transaction record associated with a payment transaction. The record may include transaction data indicating a payor, a payee and/or an amount and/or other information related to the transaction. The next step, as represented by block 820, is to access a distributed ledger that is updated based on communications from a blockchain distributed network. Next, as represented by block 830, is to determine whether the transaction record represents a valid transaction using the payment transaction logic (i.e., rules that dictate functionality of the blockchain distributed network). Finally, as represented by block 840, the system (or a validating node) communicates validation or invalidation of the transaction record to the blockchain distributed network by updating the distributed ledger and making it available to the network.

Referring now to FIG. 9, a flowchart illustrating a method for using a block chain distributed network for settlement of a payment transaction is shown in accordance with embodiments of the invention. The first step, as represented by block 910, is to initiate crediting the amount to an account of the payee indicated by the transaction record. This may be facilitated through the distributed network of the blockchain. Next, as represented by block 920, is to update the distributed ledger with information indicating crediting of the amount to an account of the payee and provide access to the distributed ledger to the network.

Referring now to FIG. 10, a flowchart illustrating a method for using a block chain distributed network for processing an invalid transaction is shown in accordance with embodiments of the invention. First, as represented by block 1010, is to determine that the transaction record represents an invalid transaction. For example, this may be done by the system by determining that the transaction record involves an invalid payment instrument having associated funds less than or equal to the amount indicated in the transaction data. Next, as represented by block 1020, the system communicates to the user (i) that the payor account has a balance less than the transaction amount and/or (ii) an additional amount necessary for the transaction to continue processing. Next, as represented by block 1030, the system receives a second transaction record, originating from the payor and including second transaction data indicating an additional second amount intended to supplement the payment instrument associated funds to attain or surpass the transaction amount. Then, as represented by block 1040, the system may re-access the distributed ledger and, using the payment transaction logic, determines that the associated funds plus the second amount meets or exceeds the transaction amount. Next, as represented by block 1050, in response, the system initiates crediting the payee account with the transaction amount. Finally, as represented by block 1060, the system communicates validation of the transaction record to the blockchain distributed network by updating the distributed ledger and making it available.

In various embodiments, the block chain may be configured with a set of rules to dictate when and how transactions are validated/invalidated/neither, transactions are approved and other details about how the network communicates data and the like. In some embodiments, the rules dictate that an originating node (i.e., a node associated with an issuing bank) must approve all transactions associated with cards issued from the issuing bank. In some embodiments, the rules dictate that some or all transactions may be approved by one or more validator nodes without further input from the originating node. In some such cases, the rules dictate that the issuing bank, when initiating use blockchain for transaction validation and/or settlement places additional information that is useful in determining whether transactions associated with the issuing bank should be approved. In other embodiments, the validating node must reach out to the originating node in certain situations as dictated by the rules. For example, if the transaction must be validated by multiple nodes, then the rules may dictate that the validating node communicate with the originating node to confirm or deny validation of the transaction.

In some embodiments, the validator may approve the transaction without communicating with the originating node. In such a case, the validator (or a group or all of validators if multiple or universal validations, respectively, are required by the rules), can approve the transaction based solely on the information contained in the blockchain. Thus, if a transaction is requested and a validator receives the transaction, it can check the transaction's against its ledger to determine whether an originating node has validated the transaction. If so, then the validator may approve the transaction. In this regard, the transaction may be approved very quickly, and in some cases, in real-time or near real-time.

In various embodiments, any of the nodes 610 may be a validator or a miner that validates transactions. In some embodiments, a number of the nodes 610 must validate a transaction in order for the transaction to be approved. For example, in one embodiment, three nodes 610 must validate the authenticity of the transaction and/or one or more characteristics associated with the transaction before the transaction may be approved. As noted above, in some instances, the rules of the blockchain and/or rules specific to particular originating FIs or validators dictate that validators cannot approve transactions without confirming available funds. In some cases, available funds information is already associated with alias mapping on the public blockchain, but in other cases, the validator must communicate with the originating FI in order to request approval of the transaction.

In some embodiments logic and/or rules may only be changed by the originating node (maintained by an originating entity or entities, e.g., an issuing bank) to ensure the validity of a transaction. In some cases, particularly in cases where one or more nodes have raised a concern that a transaction is not valid, the originating node may be contacted for verification of the transaction.

In various embodiments, the transaction record is stored and considered from one or more systems and is not placed on the public block chain itself. In some embodiments, the transaction record is only stored and executed from a subset of the nodes of the block chain, which, in some embodiments, are synonymous with validator nodes and in other embodiments are not synonymous with the validator nodes. In some embodiments, placeholder(s) for the transaction record, portions of the transaction record and/or pseudo-transactions indicating that the transaction record exists and is accessible from block chain may be placed on the block chain. In some cases, the transaction record may be considered only by the designated one or more systems. Such systems may utilize a key or other security mechanism(s) in order to ensure only certain nodes are allowed access to the transaction record. In some cases, this configuration may result in additional security than placing the transaction record on the block chain for any node to consider.

In various embodiments, a transaction record/request placed on the blockchain initiates execution of the transaction validation logic/rules and, once a predetermined threshold number of nodes have agreed that the transaction validation has been satisfied, then the transaction proceeds for further processing, i.e., the transaction may be approved and, subsequently, settled.

Typically, the user may be required to authenticate identity for access to an application or device as described herein. Likewise one or more nodes, administrators or users of the blockchain or other entities interacting with or using the blockchain may be required to authenticate their identity for access to a particular feature, function or action of an application, device, a smart contract and/or general or specific access to the blockchain network. Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication.

The different types of authentication may provide differing degrees of confidence regarding the authentication using such types. For example, if a username by itself is used for a first user authentication, and a username along with a password is used for a second authentication, then the second authentication should provide a higher confidence regarding the authentication because of the additional layer of authentication required. Further, within the types of authentication, varying levels of confidence may be used. For example, when using a password, an administrator may require users to create a password according to strict rules designed to increase the security level of the password, and therefore increase the confidence of any authentication using the password.

Accordingly, a continuum of authentication may be used to quantify (or dictate) the levels of authentication. Likewise, a continuum of functions permitted may be used to quantify (or dictate) the number or context in which functions are permitted.

Referring to FIG. 11A, a continuum of authentication 1100A is illustrated according to embodiments of the invention. On the left-hand side of the continuum, a "zero authentication" requires no authentication credentials. On the right-hand side of the continuum, a "hard authentication"

requires full authentication credentials. This means that it requires the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum. As discussed below with reference to FIG. 11C, the continuum of authentication 1100A may be coupled with an application functions permitted continuum 1100B, first illustrated in FIG. 11B.

Referring to FIG. 11B, the application functions permitted continuum 1100B illustrates various levels of application functions permitted. Functions may refer to what a user is permitted to "see" (e.g., transactions placed on the block chain, etc.) and/or what the user is permitted to "do" (e.g., validate transactions, stored and/or execute a smart contract, etc.). More specifically, this may refer to whether a specific function is permitted at a certain point on the continuum and/or the context in which a certain function is permitted. The left-hand side of the continuum indicates that no functions are permitted, and the right-hand side of the continuum indicates that all functions are permitted. In between the extremes, minimal functions are permitted, moderate functions are permitted and most functions are permitted. Thus, any given point along the continuum 1100B corresponds with a certain amount and/or number of functions that are permitted and/or the context in which certain functions are permitted.

Referring now to FIG. 11C, a diagram 1100C illustrates a coupling of the application functions permitted continuum 1100B and the levels of authentication continuum 1100A. As shown, the continua 1100B and 1100A may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum 1100B provides that a particular function or functions may be permitted given that a specified level of authentication credentials are supplied, as indicated by the corresponding point on continuum 1100A. For example, a financial institution and/or a user may arrange the continua 1100B and 1100A with respect to one another and may adjust the arrangement based on changing desires or goals.

In some embodiments, one or both the continua 1100B and 1100A may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention.

Referring now to FIG. 11D, a diagram 1100D illustrates a relationship between the functions permitted and the authentication types. As shown in FIG. 11D, the soft authentication continuum between zero authentication and hard authentication may include one or more authentication types (A, B, C in the Figure). In one aspect, the one or more authentication types corresponding to the one or more authentication credentials received from the user and one or more functions associated with the application permitted for user access are positively correlated. For example, a username may enable the user to gain access to checking balance, a username and password may enable the user to gain access to checking balance, funds transfer between the user's first bank account and second bank account, and downloading previous statements, and a username, password and challenge question may enable the user to gain complete access to all the functions of the applications and devices. In one aspect, the user may have to provide authentication credentials corresponding to authentication types A and B to gain access to moderate functions associated with the application. For example, the user may provide a username and password to access a balance check and funds transfer. In another aspect, the user may have to provide authentication credentials corresponding to authentication types A, B, and C to gain access to most function associated with the application. For example, the user may provide a username, password, and a personal identification number to access a balance check, a funds transfer, a deposit, a bill-pay, and access to submitting a transaction request associated with a smart contracts rewards program. In yet another aspect, the user may have to only provide authentication credentials corresponding to authentication type A to gain access to minimal functions associated with the application. For example, the user may provide a username to access a balance check or to confirm that particular rewards were disbursed to the user's account through the smart contract rewards program.

In some embodiments of the invention one or more of the systems described herein may be combined with each other, or otherwise perform the functions of the other systems described herein. In other embodiments of the invention one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems or devices 50 described herein. For example, a portion of the link application 17 may be stored on the user computer systems 20, or may be included as a portion of financial institution applications, such as an online banking application, in order to achieve the inventions described herein.

It should be understood, that the systems and devices 50 described in FIGS. 1-3, or other devices not specifically described herein, may be configured to establish a communication link with each other in order to accomplish the steps of the processes described herein. The link may be an internal link within the same entity (e.g., within the same financial institution or device provider) or a link with the other systems of entities (e.g., social networking systems, third-party systems, or the like). In some embodiments, the systems may be configured for monitoring the applications 27 and devices 50 that the user utilizes. The information received from monitoring may be provided via wireless network path portions through the Internet. When the systems or devices 50 are not monitoring a source or are not being monitoring, the information need not be transmitted from the source through the Internet to the destination, although it could be. The sources of information may be made continuously available, however, continuously available does not necessarily mean that the sources actually continuously generates data, but that a source is continuously available to generate and send data real-time (e.g., instantaneously and/or within a few seconds, or the like) of receiving a request for it. In any case, the sources may be continuously available to receive and/or generate information, in some cases in digitized data in Internet Protocol (IP) packet format. In response to continuously monitoring the real-time data feeds from the various systems or devices 50, the system may be configured to provide target information to the user 4 and/or allow the user to make changes to or control the applications 27 and/or devices 50, in part in order to reach the target.

Moreover, it should be understood that the process flows described herein include transforming the information sent and/or received from the applications of the different systems (e.g., internally or externally) and/or the devices 50 from one or more data formats into a data format associated with the link application 17 for display to the user 4 on the user computer systems 20. There are many ways in which information is converted within the linked system environment 1. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may converting to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 14/942,326 | TRANSPARENT SELF-MANAGING REWARDS PROGRAM USING BLOCKCHAIN AND SMART CONTRACTS | Nov. 16, 2015 |
| 15/041,555 | BLOCK CHAIN ALIAS FOR PERSON-TO-PERSON PAYMENTS | Feb. 11, 2016 |
| 62/253,935 | BLOCK CHAIN ALIAS PERSON-TO-PERSON PAYMENT | Nov. 11, 2015 |
| 15/041,566 | BLOCK CHAIN ALIAS PERSON-TO-PERSON PAYMENTS | Feb. 11, 2016 |
| 15/050,375 | SYSTEM FOR CONVERSION OF AN INSTRUMENT FROM A NON-SECURED INSTRUMENT TO A SECURED INSTRUMENT IN A PROCESS DATA NETWORK | Feb. 22, 2016 |
| 15/050,379 | SYSTEM FOR EXTERNAL SECURE ACCESS TO PROCESS DATA NETWORK | Feb. 22, 2016 |
| 15/050,358 | SYSTEM FOR PROVIDING LEVELS OF SECURITY ACCESS TO A PROCESS DATA NETWORK | Feb. 22, 2016 |
| 62/293,585 | SYSTEM FOR SECURE ROUTING OF DATA TO VARIOUS NETWORKS FROM A PROCESS DATA NETWORK | Feb. 10, 2016 |
| 62/293,620 | SYSTEM FOR CENTRALIZED CONTROL OF SECURE ACCESS TO PROCESS DATA NETWORK | Feb. 10, 2016 |
| 15/049,605 | SYSTEM FOR CONTROL OF SECURE ACCESS AND COMMUNICATION WITH DIFFERENT PROCESS DATA NETWORKS WITH SEPARATE SECURITY FEATURES | Feb. 22, 2016 |
| 15/049,716 | SYSTEM FOR CONTROL OF DEVICE IDENTITY AND USAGE IN A PROCESS DATA NETWORK | Feb. 22, 2016 |
| 15/049,777 | SYSTEM FOR ESTABLISHING SECURE ACCESS FOR USERS IN A PROCESS DATA NETWORK | Feb. 22, 2016 |
| 15/049,835 | SYSTEM FOR ALLOWING EXTERNAL VALIDATION OF DATA IN A PROCESS DATA NETWORK | Feb. 22, 2016 |
| 15/050,094 | SYSTEM FOR CONVERSION OF AN INSTRUMENT FROM A NON-SECURED INSTRUMENT TO A SECURED INSTRUMENT IN A PROCESS DATA NETWORK | Feb. 22, 2016 |
| 62/287,293 | SYSTEM FOR CONVERSION OF AN INSTRUMENT FROM A NON-SECURED INSTRUMENT TO A SECURED INSTRUMENT IN A PROCESS DATA NETWORK | Jan. 26, 2016 |
| 15/050,098 | SYSTEM FOR TRACKING AND VALIDATION OF MULTIPLE INSTANCES OF AN ENTITY IN A PROCESS DATA NETWORK | Feb. 22, 2016 |
| 62/287,301 | SYSTEM FOR TRACKING AND VALIDATION OF MULTIPLE INSTANCES OF AN ENTITY IN A PROCESS DATA NETWORK | Jan. 26, 2016 |
| 15/050,084 | SYSTEM FOR TRACKING AND VALIDATION OF AN ENTITY IN A PROCESS DATA NETWORK | Feb. 22, 2016 |
| 62/287,298 | SYSTEM FOR TRACKING AND VALIDATION OF AN ENTITY IN A PROCESS DATA NETWORK | Jan. 26, 2016 |
| 15/050,372 | SYSTEM FOR ROUTING OF PROCESS AUTHORIZATIONS AND SETTLEMENT TO A USER IN A PROCESS DATA NETWORK | Feb. 22, 2016 |
| 15/050,285 | SYSTEM FOR ROUTING OF PROCESS AUTHORIZATION AND SETTLEMENT TO A USER IN PROCESS DATA NETWORK BASED ON SPECIFIED PARAMETERS | Feb. 22, 2016 |
| 15/050,292 | SYSTEM FOR GRANT OF USER ACCESS AND DATA USAGE IN A PROCESS DATA NETWORK | Feb. 22, 2016 |
| 15/049,865 | SYSTEM FOR EXTERNAL VALIDATION OF PRIVATE-TO-PUBLIC TRANSITION PROTOCOLS | Feb. 22, 2016 |
| 15/049,852 | SYSTEM FOR EXTERNAL VALIDATION OF DISTRIBUTED RESOURCE STATUS | Feb. 22, 2016 |
| 15/050,316 | SYSTEM FOR TRACKING TRANSFER OF RESOURCES IN A PROCESS DATA NETWORK | Feb. 22, 2016 |

-continued

| U.S. patent application Ser. No. | Title | Filed On |
|---|---|---|
| 15/050,321 | SYSTEM FOR MANAGING SERIALIZABILITY OF RESOURCE TRANSFERS IN A PROCESS DATA NETWORK | Feb. 22, 2016 |
| 15/050,307 | SYSTEM TO ENABLE CONTACTLESS ACCESS TO A TRANSACTION TERMINAL USING A PROCESS DATA NETWORK | Feb. 22, 2016 |

The invention claimed is:

1. A system for validation and approval of a payment transaction, the system comprising:
a block chain distributed network comprising a plurality of decentralized nodes, each decentralized node having a first memory and at least one first processing device operatively coupled to the first memory, wherein the first memory of decentralized nodes is configured to store a distributed ledger comprising a plurality of blocks that store data, wherein the block chain distributed network is configured to certify that the data stored in the blocks is authentic;
a second memory; and
a second processing device operatively coupled to the second memory, wherein the second processing device is configured to execute computer-readable program code to:
receive a transaction record associated with a payment transaction, wherein the transaction record comprises transaction data indicating a payor, a payee and an amount;
access the distributed ledger, wherein the distributed ledger is updated based on communications from the block chain distributed network;
using payment transaction logic, determine, by one of the plurality of decentralized nodes acting as an originating node associated with the transaction record, that the transaction record represents a valid transaction;
store, using a blockchain transaction validation logic, the transaction record on the distributed ledger, wherein storing further comprises inputting additional information indicating that the transaction record (i) represents a valid transaction and (ii) requires approval by one or more of the plurality of decentralized nodes acting as validator nodes, wherein the validator nodes are different nodes than the originator node;
receive a request from the one or more validator nodes to access the transaction record;
communicate the transaction record to the one or more validator nodes; and
determine, by the one or more validating nodes and based on the additional information in the distributed ledger, that the transaction record has been validated by the originating node; and
approve, by the one or more validating nodes, the transaction record based on at least determining that the transaction record has been validated by the originating node, wherein the one or more validator nodes are configured to approve the transaction without any communication with the originating node.

2. The system of claim 1, wherein the second processing device is configured to execute computer-readable program code further to:
determine that the transaction record represents a valid transaction by determining that the transaction record involves a valid payment instrument having associated funds less than or equal to the amount indicated in the transaction data.

3. The system of claim 1, wherein the second processing device is configured to execute computer-readable program code further to:
communicate the transaction record to the originating node for validation of the transaction record.

4. The system of claim 2, wherein the second processing device is configured to execute computer-readable program code further to:
communicate validation of the transaction record to the block chain distributed network.

5. The system of claim 2, wherein the second processing device is configured to execute computer-readable program code further to:
update the distributed ledger with information indicating validation of the transaction record and provide access to the distributed ledger to the block chain distributed network.

6. The system of claim 2, wherein the second processing device is configured to execute computer-readable program code further to:
initiate crediting the amount to an account of the payee indicated by the transaction record.

7. The system of claim 6, wherein the second processing device is configured to execute computer-readable program code further to:
update the distributed ledger with information indicating crediting of the amount to an account of the payee indicated by the transaction record and provide access to the distributed ledger to the block chain distributed network.

8. The system of claim 1, wherein the transaction record is encrypted and the processing device is configured to execute computer-readable program code further to decrypt the transaction record.

9. The system of claim 1, wherein the second processing device is configured to execute computer-readable program code further to:
determine that the transaction record represents an invalid transaction by determining that the transaction record involves an invalid payment instrument having associated funds less than or equal to the amount indicated in the transaction data.

10. A method for validation of a payment transaction, the method comprising:
providing for a block chain distributed network comprising a plurality of decentralized nodes, each decentralized node having a first memory and at least one first processing device operatively coupled to the first memory, wherein the first memory of decentralized nodes is configured to store a distributed ledger comprising a plurality of blocks that store data, wherein the block chain distributed network is configured to certify that the data stored in the blocks is authentic
receiving, by a computing processing device, a transaction record associated with a payment transaction, wherein the transaction record comprises transaction data indicating a payor, a payee and an amount;
accessing, by a computing processing device, the distributed ledger stored in the memory device, wherein the distributed ledger is updated based on communications from the block chain distributed network;

using payment transaction logic, determining, by a computing processing device of one of the plurality of nodes acting as an originating node associated with the transaction record, that the transaction record represents a valid transaction;

receiving, by a computing processing device, a request from one or more of the plurality of decentralized nodes acting as validator nodes to access the transaction record wherein the validator nodes are different nodes than the originator node;

communicating, by a computing processing device, the transaction record to the one or more validator nodes;

storing, using a blockchain transaction validation logic, by a computing processing device, the transaction record on the distributed ledger, wherein storing further comprises inputting additional information indicating that the transaction record represents a valid transaction and requires approval by one or more validator nodes; and determining, by at least one computing processing device of one or more of the validating nodes and based on the additional information in the distributed ledger, that the transaction record has been validated by the originating node; and approving, by the at least one computing processing device of the one or more of the validating nodes, the transaction record based on at least determining that the transaction record has been validated by the originating node, wherein the one or more validator nodes are configured to approve the transaction without any communication with the originating node.

11. The method of claim 10, further comprising:
determining, by a computing processing device, that the transaction record represents a valid transaction by determining that the transaction record involves a valid payment instrument having associated funds less than or equal to the amount indicated in the transaction data.

12. The method of claim 10, further comprising:
communicating, by a computing processing device, the transaction record to an originating node for validation of the transaction record.

13. The method of claim 11, further comprising:
communicating, by a computing processing device, validation of the transaction record to the block chain distributed network.

14. The method of claim 11, further comprising:
updating, by a computing processing device, the distributed ledger with information indicating validation of the transaction record and provide access to the distributed ledger to the block chain distributed network.

15. The method of claim 11, further comprising:
initiating, by a computing processing device, crediting the amount to an account of the payee indicated by the transaction record.

16. The method of claim 15, further comprising:
updating, by a computing processing device, the distributed ledger with information indicating crediting of the amount to an account of the payee indicated by the transaction record and provide access to the distributed ledger to the block chain distributed network.

17. The method of claim 10, wherein the transaction record is encrypted and the method further comprises decrypting, by the processing device, the transaction record.

18. The method of claim 10, further comprising:
determining, by a computing processing device, that the transaction record represents an invalid transaction by determining that the transaction record involves an invalid payment instrument having associated funds less than or equal to the amount indicated in the transaction data.

* * * * *